United States Patent [19]
Nonaka et al.

[11] Patent Number: 5,708,860
[45] Date of Patent: Jan. 13, 1998

[54] DISTANCE MEASUREMENT APPARATUS AND OPTICAL SYSTEM USING THE SAME

[75] Inventors: Osamu Nonaka, Sagamihara; Kazunori Mizokami, Hachioji, both of Japan

[73] Assignee: Olympus Optical Co., Ltd., Tokyo, Japan

[21] Appl. No.: 521,032

[22] Filed: Aug. 29, 1995

[30] Foreign Application Priority Data

Aug. 31, 1994 [JP] Japan ................. 6-207271
Sep. 8, 1994 [JP] Japan ................. 6-214653

[51] Int. Cl.$^6$ ................. G03B 3/00; G03B 17/08
[52] U.S. Cl. ................. 396/28; 396/25
[58] Field of Search ................. 354/64, 403; 396/25, 396/26, 28

[56] References Cited

U.S. PATENT DOCUMENTS

| | | | |
|---|---|---|---|
| 3,571,649 | 3/1971 | Bush, Jr. ................. | 396/28 |
| 3,882,887 | 5/1975 | Rekai . | |
| 3,936,187 | 2/1976 | Momose . | |
| 4,357,083 | 11/1982 | Johnson et al. . | |
| 4,415,245 | 11/1983 | Harvey . | |
| 4,470,680 | 9/1984 | Inagaki ................. | 396/28 |
| 4,514,084 | 4/1985 | Makino et al. . | |
| 4,634,253 | 1/1987 | Tamamura ................. | 354/403 |
| 4,653,883 | 3/1987 | Maeno . | |
| 4,697,897 | 10/1987 | Tamamura . | |
| 4,707,094 | 11/1987 | Tusting . | |
| 4,785,322 | 11/1988 | Harrison et al. . | |
| 4,876,565 | 10/1989 | Tusting . | |
| 4,898,462 | 2/1990 | Numata et al. . | |
| 4,999,664 | 3/1991 | Foust ................. | 354/64 |
| 5,111,222 | 5/1992 | Hayakawa et al. . | |
| 5,153,622 | 10/1992 | Hayakawa et al. . | |
| 5,438,363 | 8/1995 | Ejima et al. ................. | 354/64 |
| 5,459,568 | 10/1995 | Yano et al. . | |
| 5,534,708 | 7/1996 | Ellinger et al. . | |

FOREIGN PATENT DOCUMENTS

| | | |
|---|---|---|
| 57-144409 | 9/1982 | Japan . |
| 59-53819 | 3/1984 | Japan . |
| 59-131919 | 7/1984 | Japan . |
| 59-131921 | 7/1984 | Japan . |
| 60-61732 | 4/1985 | Japan . |
| 60-98836 | 7/1985 | Japan . |
| 61-295533 | 12/1986 | Japan . |
| 63-266410 | 11/1988 | Japan . |
| 3-31721 | 3/1991 | Japan . |
| 4-170532 | 6/1992 | Japan . |
| 5-8596 | 3/1993 | Japan . |

*Primary Examiner*—Safet Metjahic
*Assistant Examiner*—Michael Dalakis
*Attorney, Agent, or Firm*—Frishauf, Holtz, Goodman, Langer & Chick

[57] ABSTRACT

A CPU causes a Xe tube to emit light by charging a charging capacitor through an emission control circuit. Flash light from the Xe tube is projected toward an object to be measured through a mask, a visible light cutting filter, and a projection lens. Light reflected by the object is incident on a light-receiving element through a light-receiving lens and the visible light cutting filter. An output from the light-receiving element is input to a light position detection circuit. The CPU then calculates the distance to the object in accordance with an output from the light position detection circuit. A camera which can be used in water includes an electronic flash section capable of controlling its light amount. An underwater detection section detects whether the camera is used in water, and sends the detection result to a CPU. A distance measurement section projects a distance measurement light beam onto an object to be photographed, and measures the amount of light reflected by the object. The CPU estimates a light attenuation ratio in the environment where the camera is used on the basis of the detection result and the reflected light amount measurement result, and sets the amount of light to be emitted from the electronic flash section. With this operation, the electronic flash section is caused to emit light, and exposure in the camera is controlled by an exposure control section.

8 Claims, 17 Drawing Sheets

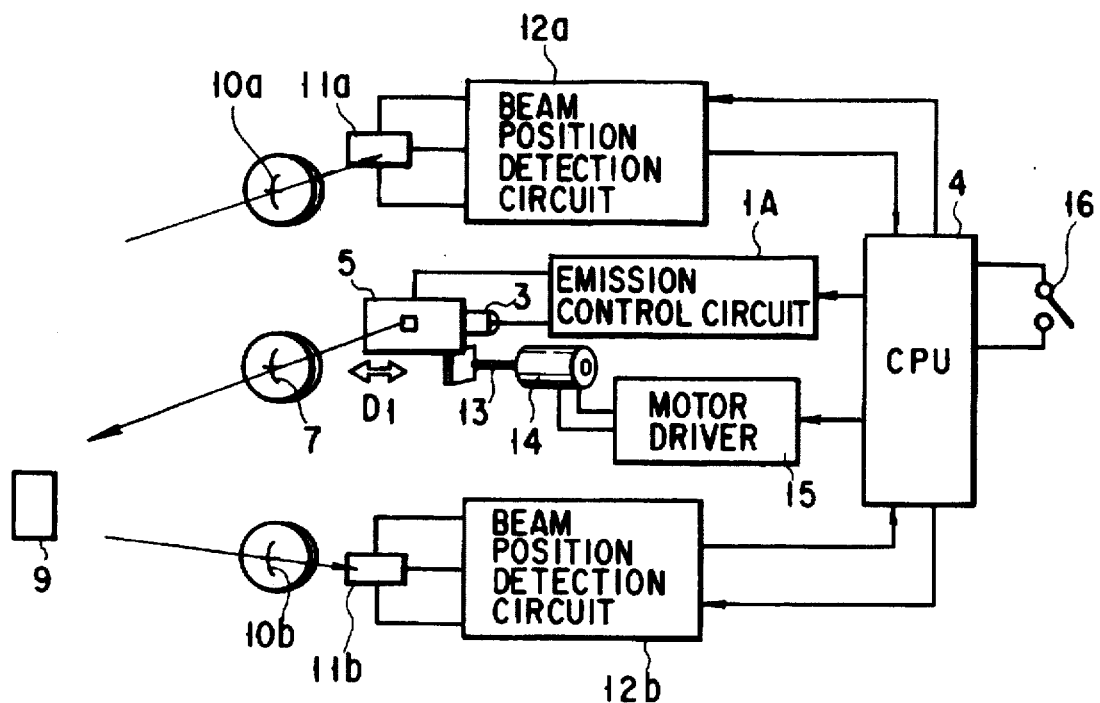
F I G. 4
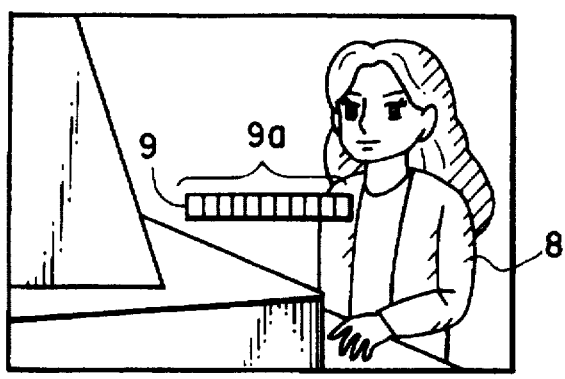
F I G. 5

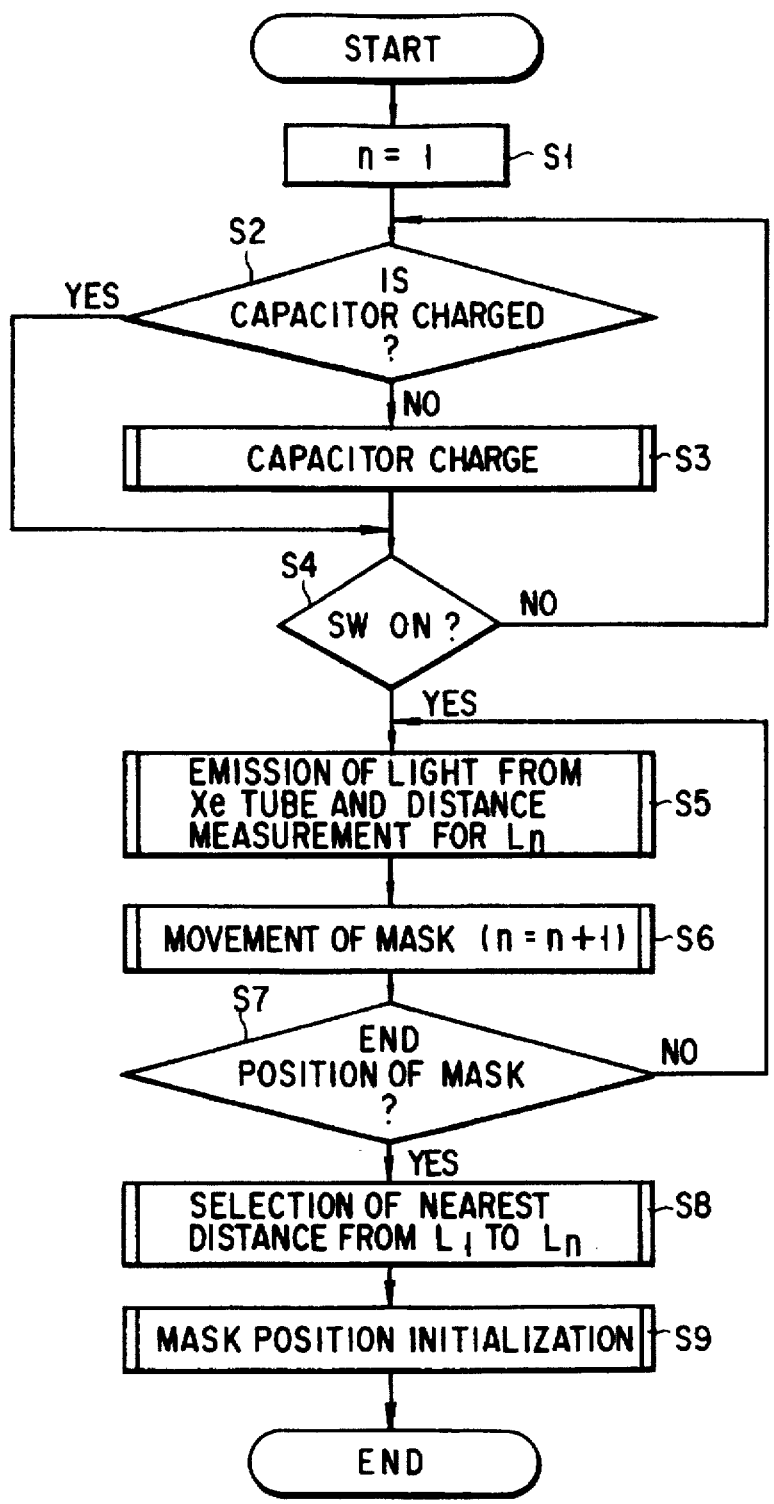
F I G. 6

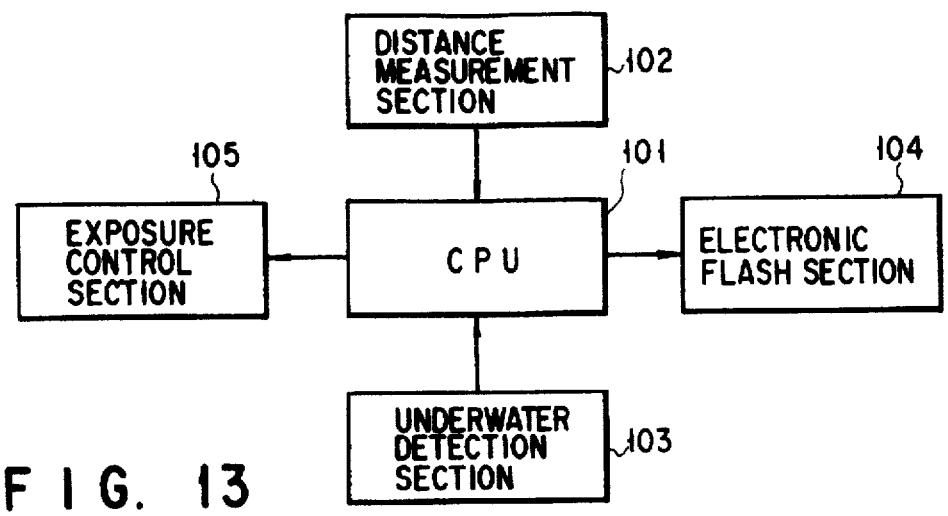
F I G. 13
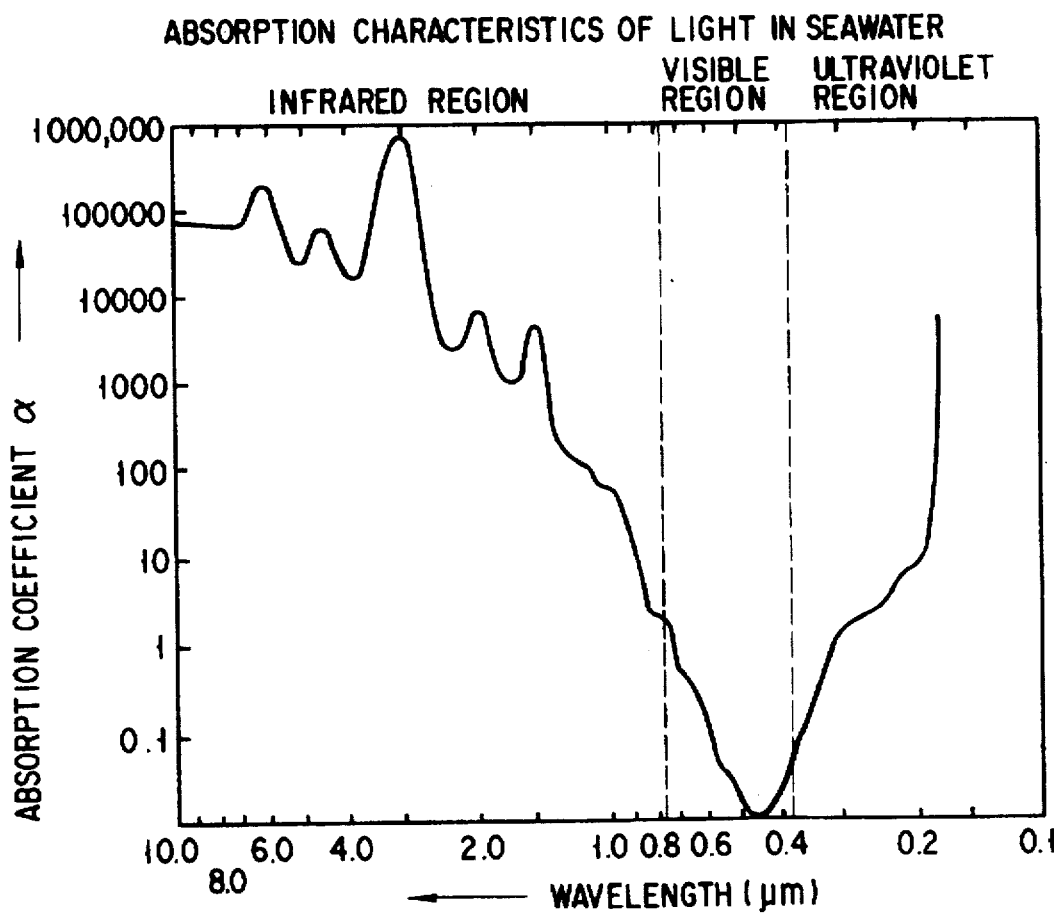
F I G. 14

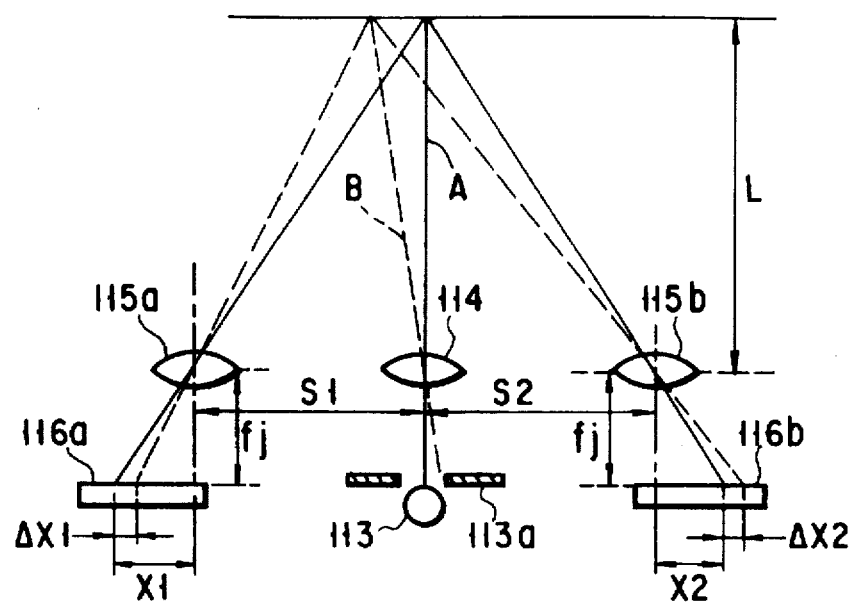
F I G. 16
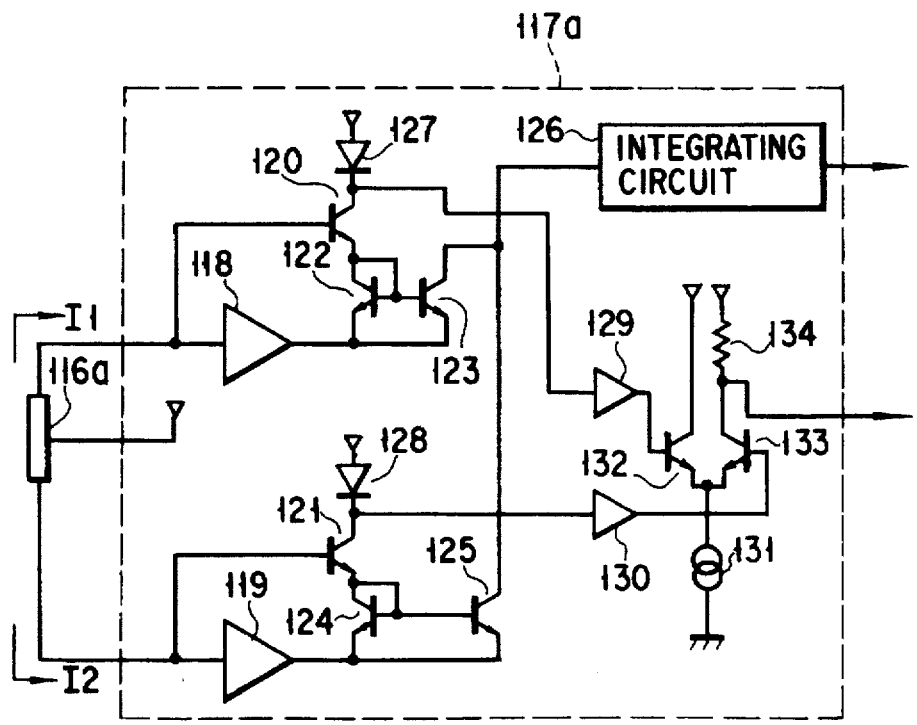
F I G. 17

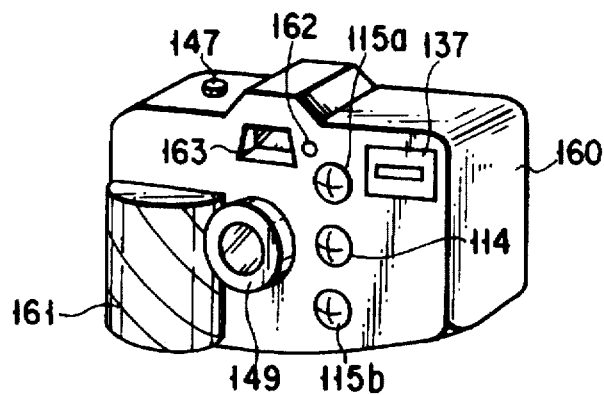
F I G. 18
F I G. 19A
F I G. 19B

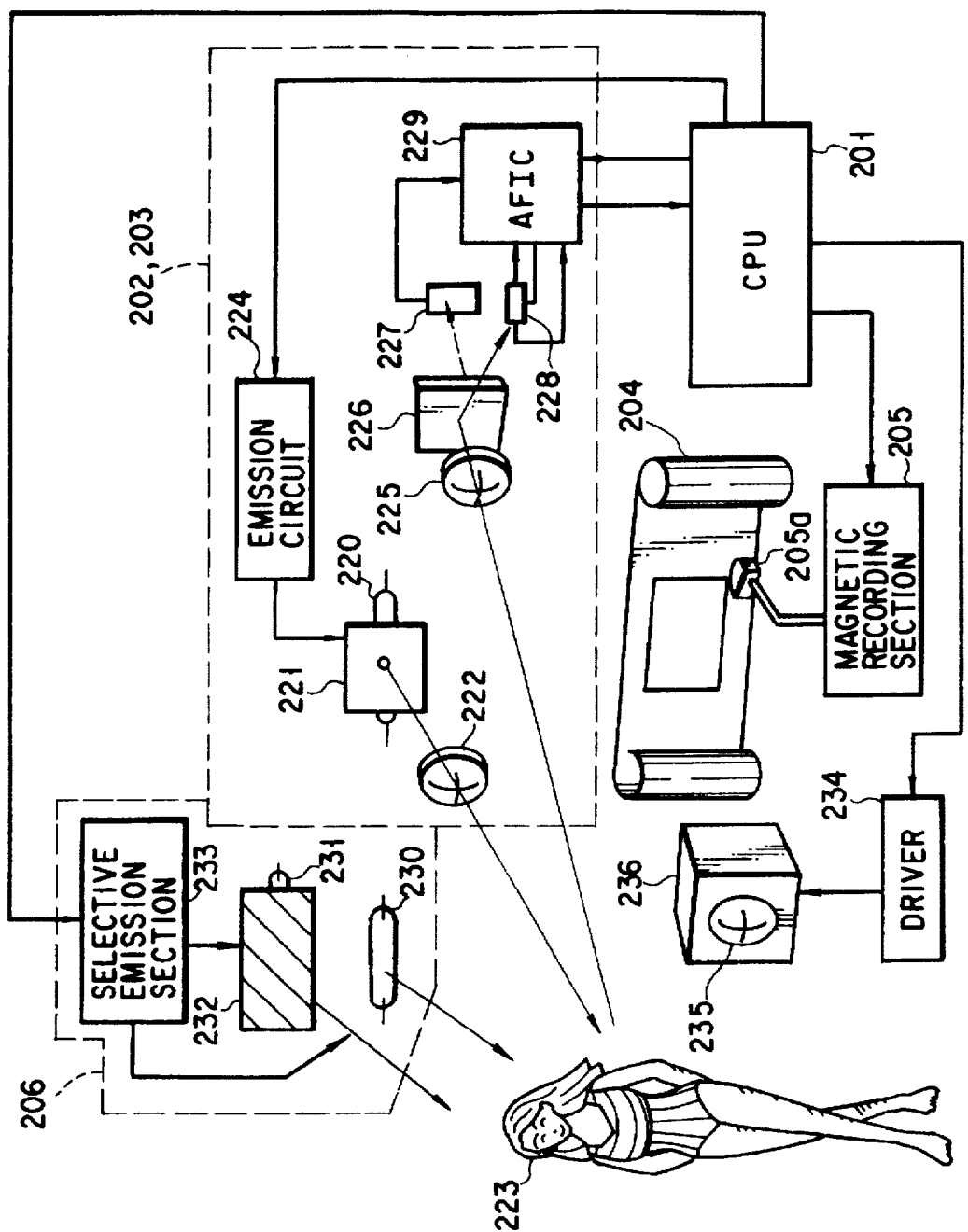
F I G. 23

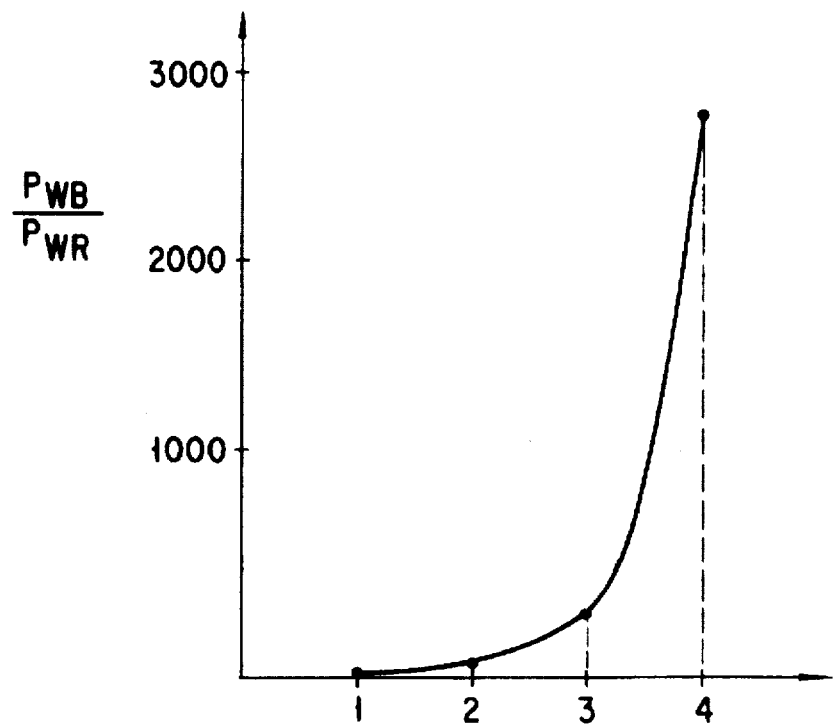
F I G. 25
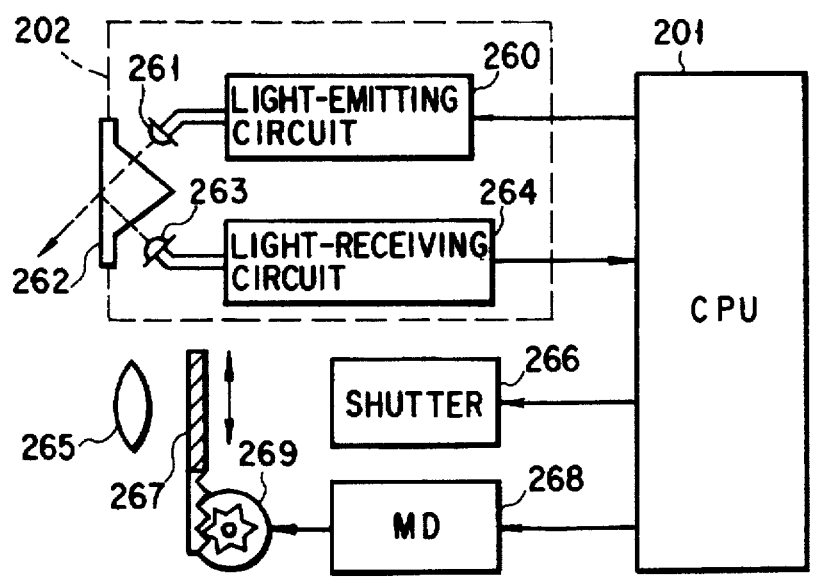
F I G. 26

DISTANCE MEASUREMENT APPARATUS AND OPTICAL SYSTEM USING THE SAME

BACKGROUND OF THE INVENTION

1. Field of the Invention

The present invention generally relates to a camera (including an amphibious camera) and, more particularly, to a distance measurement apparatus used in an optical device such as the camera.

In addition, the present invention relates to a distance measurement apparatus and, more particularly, to a so-called projection type distance measurement apparatus (autofocus) which is used for a camera or the like to project distance measurement light toward an object to be photographed so as to measure the object distance on the basis of the resultant reflected signal light.

Furthermore, the present invention relates to a camera which can be used both in water and on land and, more particularly, to a camera having an electronic flash device capable of controlling its light amount for proper exposure in accordance with a measurement result even in water.

2. Description of the Related Art

Conventionally, as a distance measurement apparatus used for an autofocus (AF) operation and applied to a camera, a projection type distance measurement has been used. Such a projection type distance measurement apparatus can perform distance measurement even in a dark place. However, this apparatus has poor performance in long distance measurement because reflected signal light amount decreases with an increase in object distance.

Since a light-projecting source with a large light amount allows distance measurement for a long distance, a technique of using flash light from a xenon tube (Xe tube), which is used as the electronic flash unit of a camera, as a light-projecting source has been proposed.

A distance measurement apparatus used for a general camera or the like uses an infrared-emitting diode (IRED) as a light-projecting source. Simple replacement of the IRED with a Xe tube, however, poses problems in practice.

One of the problems is that accurate distance measurement for a small object to be measured is difficult to perform because the Xe tube is as large in diameter as about 1 mm in contrast to an IRED having a light-emission area of about 0.4 mm. For example, in the technique disclosed in Jpn. Pat. Appln. KOKAI Publication No. 57-144409 (U.S. Pat. No. 4,514,084), strong directivity is set on the light-receiving side to solve the problem associated with the above tube diameter.

Jpn. Pat. Appln. KOKAI Publication No. 63-266410 discloses an apparatus for performing distance measurement for a long distance by using projection of light from a Xe tube only for long-distance measurement and determining whether the amount of reflected light is large or small.

The distance measurement apparatus disclosed in Jpn. UM Appln. KOKOKU Publication No. 5-8596 is an apparatus for performing distance measurement at various points instead of one point by using the fact that a Xe tube can project light over a wide range.

According the apparatus disclosed in Jpn. Pat. Appln. KOKAI Publication No. 63-266410, since reflected signal light changes with a change in the size of an object at a long distance, accurate distance measurement cannot be performed. Unlike an IRED, a Xe tube changes in light amount for each projection of light. Even if, therefore, the same object is assumed, the distance measurement precision cannot be sufficiently high.

According to the apparatuses disclosed in Pat. Appln. KOKAI Publication No. 57-144409 and Jpn. UM Appln. KOKOKU Publication No. 5-8596, since the light-receiving means is finely divided to solve the problem associated with directivity, processing circuits for light reception are required in accordance with the division number. As a result, the apparatus is complicated and increased in cost.

A problem which is not noticed and for which no measures are taken in the above official gazettes is the problem of fine movement of the emission point of a Xe tube.

The Xe tube emits light by using electric discharge in xenon gas sealed in a glass tube. The electric discharge path, however, changes for each emission of light due to a temperature distribution in the tube or the like. This leads to a change in the center of gravity of distance measurement light. Some measures therefore must be taken when a Xe tube is applied to a trigonometric distance measurement device for performing distance measurement from the incident position of reflected signal light.

With the recent spread of outdoor activities, demands have arisen for measures for underwater photography. Under the circumstances, various proposals associated with waterproof cameras (amphibious cameras) which can be used both in water and in air (on land) have been made.

Of these proposals, for example, a proposal associated with an electronic flash device used underwater is disclosed in Jpn. UM Appln. KOKAI Publication No. 60-98836 (U.S. Pat. No. 4,653,883), which discloses a waterproof connection technique for an electronic flash device and a camera body underwater. Jpn. UM Appln. KOKAI Publication No. 3-31721 (U.S. Pat. Nos. 5,111,222 and 5,153,622) discloses a technique of using a underwater sensor and changing control of a camera whether the camera is in water.

Jpn. UM Appln. KOKAI Publication No. 60-98836 discloses a waterproof camera in which an electronic flash device and a camera are coupled through a hollow pipe which is waterproofed with an elastic material, the electronic flash device is designed to be movable between a storage position and a projection position, and a groove or projection for dewatering is formed in or on one or both of the contact surfaces of the electronic flash device and the electronic flash device housing portion of the camera body.

Jpn. UM Appln. KOKAI Publication No. 3-31721 discloses a camera including an underwater sensor and a lens lock means for locking the lens when the underwater sensor detects water around the camera.

Jpn. UM Appln. KOKAI Publication Nos. 60-98836 and 3-31721 disclose no technique of controlling the light amount of an electronic flash device capable of illuminating an object to be photographed for proper exposure in water, and performing a photographing operation with good reproducibility.

SUMMARY OF THE INVENTION

It is, therefore, an object of the present invention to provide a new and improved distance measurement apparatus which takes countermeasures against the influences of fine movement of the emission point of a xenon tube, and can perform high-precision distance measurement even for an object at a long distance without being influenced by the size of the object and a change in the amount of light emitted from the Xe tube.

It is another object to provide a camera which can easily take an underwater photograph with good reproducibility by using a dimming technique such as an electronic flash device capable of illuminating an object to be photographed to allow a photographing operation with good reproducibility, which technique is used for proper exposure for the object in water.

According to an aspect of the present invention, there is provided a distance measurement apparatus for measuring a distance to an object in a camera having an electronic flash device, comprising flash light emitting means for emitting flash light by discharging charge stored in a capacitor first light-receiving means, arranged at a position separated from the flash light emitting means by a first base length, for receiving light of the flash light which is reflected by the object and outputting a first signal corresponding to an incident position of the light second light-receiving means, arranged at a position separated from the flash light emitting means by a second base length, for receiving light of the flash light which is reflected by the object and outputting a second signal corresponding to an incident position of the light and calculation means for calculating a distance to the object on the basis of the first and second signals from the first and second light-receiving means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a block diagram showing the arrangement of a distance measurement apparatus according to the second embodiment of the present invention;

FIG. 5 is a view showing a scene in which distance measurement is performed for a plurality of points within a frame;

FIG. 6 is a flow chart for explaining the operation of the distance measurement apparatus having the arrangement shown in FIG. 4;

FIG. 13 is a block diagram showing the arrangement of a camera according to the fifth embodiment of the present invention;

FIG. 14 is a graph showing the light absorption characteristics of seawater;

FIG. 16 is a view showing an optical system through which a distance measurement section emits and receives light in the sixth embodiment;

FIG. 17 is a block diagram showing a circuit in an AFIC 117a in the second embodiment;

FIG. 18 is a perspective view showing the outer appearance of the camera of the sixth embodiment;

FIGS. 19A and 19B are views showing general underwater photographs;

FIG. 23 is a block diagram showing the arrangement of a camera according to the eighth embodiment;

FIG. 25 is a graph showing the relationship between the ratio of blue light to red light in water and the object distance; and FIG. 26 is a block diagram showing the arrangement of the characteristic portion of a camera according to the ninth embodiment.

DETAILED DESCRIPTION OF THE PREFERRED EMBODIMENTS

Figure 1:
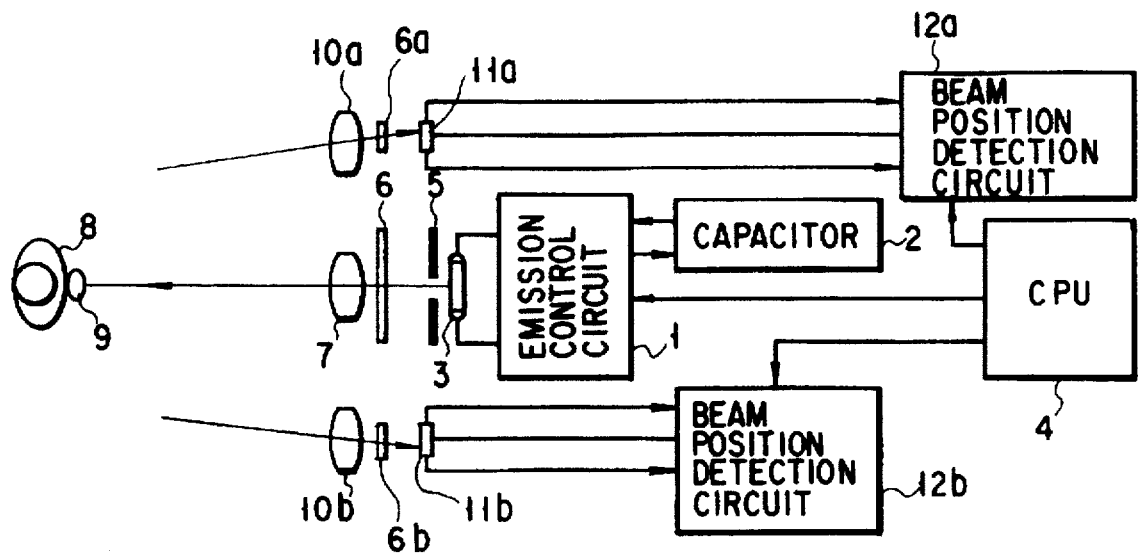
FIG. 1 is a block diagram showing the concept of a distance measurement apparatus according to the first embodiment of the present invention.

Reference will now be made in detail to the presently preferred embodiments of the invention as illustrated in the accompanying drawings, in which like reference characters designate like or corresponding parts throughout the several drawings.

The embodiments of the present invention will be described below with reference to the accompanying drawings.

FIG. 1 shows the concept of a distance measurement apparatus according to the first embodiment of the present invention.

Referring to FIG. 1, a charging capacitor 2 and a xenon tube (Xe tube) 3 are connected to an emission control circuit 1. The emission control circuit 1 controls the emission of light from the Xe tube 3, together with a microcomputer (CPU) 4 connected to the emission control circuit 1, by charging the charging capacitor 2 for causing the Xe tube 3 to emit light.

A mask 5 having a small window, a visible light cutting filter 6, and a projection lens 7 are arranged in front of the Xe tube 3. When the Xe tube 3 emits light, a large projection pattern is formed. For this reason, the mask 5 is inserted to minimize the area of a projection pattern 9 of distance measurement light projected from the projection lens 7 onto an object 8 to be measured. Note that the visible light cutting filter 6 serves to prevent the object 8, if it is a human figure, from being dazzled.

On the light-receiving side, light reflected by the object 8 is incident on light-receiving elements 11a and 11b through a pair of light-receiving lenses 10a and 10b and visible light cutting filters 6a and 6b. Each of the light-receiving elements 11a and 11b is assumed to be constituted by a semiconductor light position detector (PSD) for outputting a signal dependent on the position of light reflected by the object 8. Outputs from the light-receiving elements 11a and 11b are respectively input to light position detection circuits 12a and 12b connected to the CPU 4.

In a binocular light-receiving distance measurement apparatus having two light-receiving lenses, the charging capacitor 2 is charged by the CPU 4 and the emission control circuit 1 to cause the Xe tube 3 to emit light. When the Xe tube 3 emits flash light, the area of the projection pattern is reduced by the window of the mask 5, and the visible light is cut by the visible light cutting filter 6. The resultant light is then projected on the object 8 through the projection lens 7.

The light reflected by the object is incident on the light-receiving elements 11a and 11b through the light-receiving lenses 10a and 10b and the visible light cutting filters 6a and 6b. The outputs from the light-receiving elements 11a and 11b are respectively input to the light position detection circuits 12a and 12b. The CPU 4 calculates the distance to the object 8 in accordance with the outputs from the light position detection circuits 12a and 12b. The calculated distance is used for an AF operation.

Figure 2:
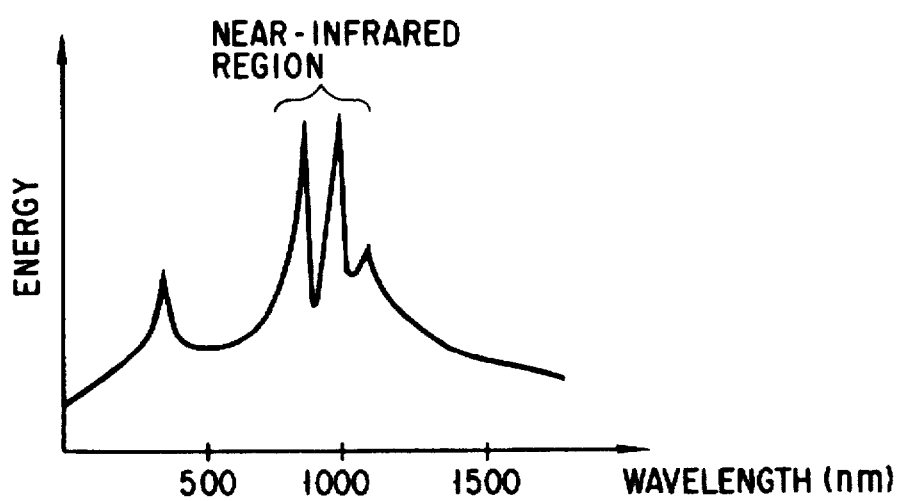
FIG. 2 is a graph showing the wavelength distribution of light emitted from a xenon (Xe) tube.

FIG. 2 is a graph showing the wavelength distribution of light from the Xe tube. The present invention uses energy near the peaks in the near infrared region. The visible light cutting filters 6a and 6b are inserted in front of the light position detection circuits 12a and 12b. With this arrangement, distance measurement with a high S/N ratio can be performed by optically removing noise components such as illumination light and sunlight irradiated on the object 8.

In addition, infrared light is not easily influenced by the differences in reflectance between objects having different colors and hence is suitable for light used for a projection type distance measurement apparatus.

A distance measurement technique for an AF operation based on such a binocular light reception scheme and the merits of the technique will be described next with reference to FIG. 3.

A distance measurement beam spot 9 is projected on the object 8. When the light of this spot 9 is reflected without any omission, as shown in FIG. 3, barycentric positions $x_A$ and $x_B$ of the reflected light beams are determined with respect to the PSDs 11a and 11b, as indicated by the solid lines in FIG. 3.

From these barycentric positions $x_A$ and $x_B$, a base length S, and a light-receiving lens focal length $f_J$, a distance L is given by:

$$L = S \cdot f_J / (x_A + x_B) \quad (1)$$

Figure 3:
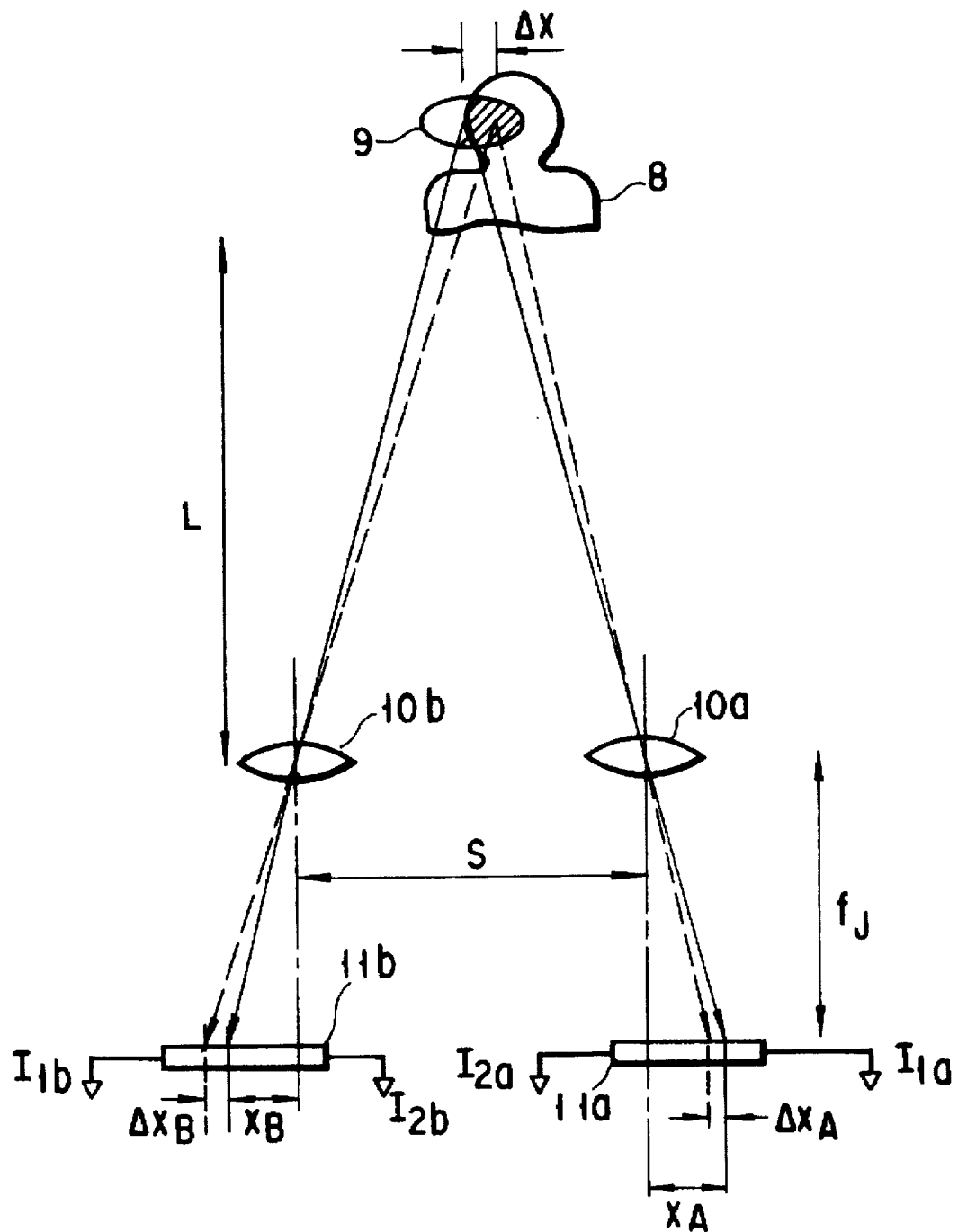
FIG. 3 is a view for explaining the merits of an AF operation performed by a binocular light reception scheme.

If part of the beam spot 9 is not properly irradiated on the object 8 (irradiated on only the hatched portion in FIG. 3), the light is reflected by the object 8 in the manner indicated by the broken lines in FIG. 3. As a result, the barycentric positions of signal light beams on the PSDs 11a and 11b respectively shift from the barycentric positions $x_A$ and $x_B$ by $\Delta x_B$ and $\Delta x_A$, as shown in FIG. 3. Such shifts increase with an increase in the size of the beam spot 9.

In a general distance measurement apparatus having only one light-receiving lens, the distance measurement result varies depending on this value $\Delta x_A$ (or $\Delta x_B$). This is because a Xe tube with a large beam spot area is difficult to use as a distance measurement light source for a general camera.

As described above, the electric discharge path of the Xe tube tends to vary for each emission of light, posing a problem associated with spot omission, in addition to the problem associated with the area of a spot beam.

If, however, light reception is performed by a binocular light reception scheme as in the present invention, the errors $\Delta x_A$ and $\Delta x_B$ of the incident positions of light beams on the PSDs cancel out each other. That is, if $|\Delta x_A|=|\Delta x_B|$, then $$x_A + x_B = (x_A - \Delta x_A) + (x_B + \Delta x_B) = x_A + x_B$$

Therefore, perfect countermeasures can be taken against distance measurement errors caused by variations in projection point in the light-projecting operation of the Xe tube and spot omission.

In addition, in this scheme which is not based on the principle of light amount measurement but is based on the principle of trigonometric distance measurement, the distance measurement precision is not basically influenced by the variations in the light amount of the Xe tube.

In the above embodiment, the visible light cutting filters 6, 6a, and 6b are inserted in front of the mask 5 and the light position detection circuits 12a and 12b. However, the visible light cutting filters 6a and 6b on the light-receiving side need not always be arranged.

The second embodiment of the present invention will be described next.

FIG. 4 shows a distance measurement apparatus according to the second embodiment of the present invention. Unlike the apparatus in FIG. 1, this apparatus is designed to perform distance measurement at a plurality of points. The same reference numerals in the second embodiment denote the same parts as in the first embodiment, and a description thereof will be omitted.

An emission control circuit 1A including a light-emitting capacitor is designed to cause a Xe tube 3 to emit light a plurality of number of times. A mask 5 arranged in front of the Xe tube 3 is moved in the direction indicated by an arrow $D_1$ in FIG. 4 upon rotation/driving of a motor 14 through a feed screw 13 every time the Xe tube 3 is caused to emit flash light. The motor 14 is controlled by a CPU 4 through a motor driver 15. A distance measurement start switch 16 is connected to the CPU 4.

When the mask 5 having a window is moved in the direction indicated by the arrow $D_1$ in FIG. 4 by rotating the feed screw 13 through the motor driver 15 and the motor 14, distance measurement can be performed at a plurality of points within a frame like the one shown in FIG. 5. That is, distance measurement can be performed at a plurality of points within a frame by sequentially irradiating a beam spot 9 on a plurality of areas 9a.

The operation of the distance measurement apparatus having such an arrangement will be described with reference to the flow chart of FIG. 6. Note that the processing indicated by the following flow chart is executed under the control of the CPU 4.

In step S1, the CPU 4 initializes a variable n representing the distance measurement point. In step S2, the CPU 4 checks whether energy generated by the Xe tube 3 is charged in the light-emitting capacitor in the emission control circuit 1. If the capacitor is not charged, the CPU 4 advances to step S3 to charge the capacitor.

If it is determined in step S2 that the charging operation is completed, the flow advances to step S4 to check the input state of the switch 16. If it is determined in step S4 that the switch 16 is not in an input state, the flow returns to step S2. If the switch 16 is in the input state, the flow advances to step S5. In step S5, the CPU 4 causes the Xe tube 3 to emit light, causes PSDs 11a and 11b to receive reflected signal light beams through light-receiving lenses 10a and 10b, and detects incident positions $x_a$ and $x_b$ of the signal light beams trough light position detection circuits 12a and 12b, thereby performing a distance measurement calculation for each point.

In this case, as shown in FIG. 3, each of the PSDs 11a and 11b sends two current outputs. In the case of the PSD 11a, two outputs $I_{1a}$ and $1_{2a}$ have characteristics which satisfy the following relationship:

$$I_{1a}/(I_{1a}+I_{2a})=A \cdot x_A/t+B \tag{2}$$

(A, B are constants, t is length of PSD)
where A and B are constants, and $\underline{t}$ is the length of the PSD. A barycentric position $x_A$ therefore can be obtained when the light position detection circuit 12a calculates $I_{1a}/(I_{1a}+I_{2a})$.

Figure 7:
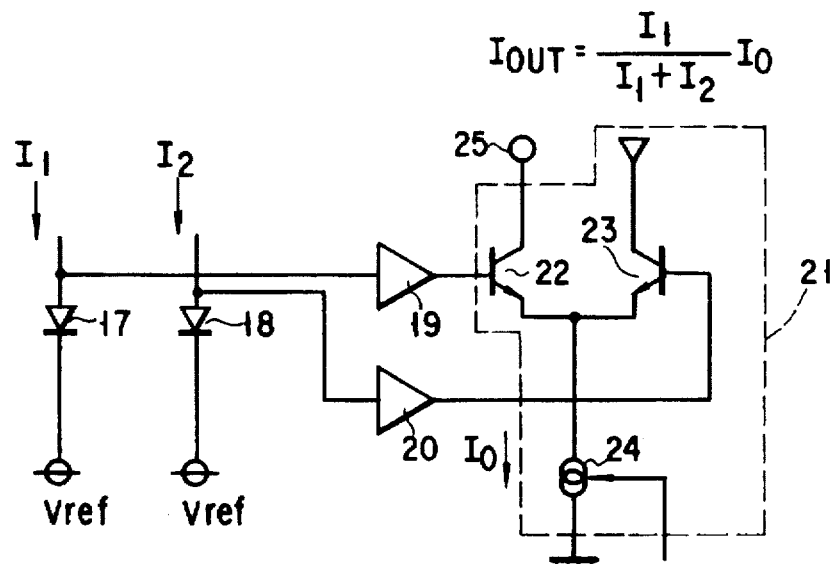
FIG. 7 is a circuit diagram showing a light position detection circuit in FIG. 4.

In calculating two currents $I_1$ and $I_2$ in the form of $I_1/(I_1+I_2)$, the currents $I_1$ and $I_2$ are respectively supplied to compression diodes 17 and 18 to be compressed, as shown in FIG. 7. By applying the resultant compressed voltages to a differential expansion circuit 21 through buffers 19 and 20, a current $I_{OUT}$ can be obtained at a terminal 25.

The differential expansion circuit 21 is constituted by npn transistors 22 and 23 having a common emitter, and a current source 24 connected to the emitter to cause a constant current $I_0$ to flow. The current source 24 can be turned on/off through a switch. By turning on the current source 24 simultaneously with emission of light, the output current $I_{OUT}$ can be obtained from the collector of the transistor 22 in the following form:

$$I_{OUT}=\{I_1/(I_1+I_2)\} \cdot I_0 \tag{3}$$

If a capacitor is connected to the terminal 25, this output current can be obtained after the elapse of a predetermined period of time. When the CPU 4 inputs the voltage across the capacitor to a built-in A/D converter, a voltage signal proportional to $A \cdot (x_A/t)+B$ in equation (2) above can be read.

If the CPU 4 detects a barycentric position $x_B$ by the same procedure as that described above after calculating the barycentric position $x_A$ from the constants A and B, a distance L to an object 8 to be measured can be obtained according to equation (1) above.

In step S5 described above, the obtained distance is set in $L_n$.

In step S6, the CPU 4 scans the mask 5 by a predetermined amount through the motor driver 15 and the motor 14, and increments the variable $\underline{n}$. Thereafter, the CPU 4 repeats emission of light from the Xe tube and distance measurement in step S5 until it is determined in step S7 that the mask 5 is moved to the end position. In this manner, as shown in FIG. 5, distance measurement can be performed at the plurality of points 9a.

In step S8, the CPU 4 selects the nearest distance from the distances $L_1$ to $L_n$ obtained as distance measurement results at the respective points. A camera having the above distance measurement apparatus can be properly focused on a human figure as the principal object to be photographed (the object 8) even in a scene where the principal object is not in the center of the frame.

Subsequently, in step S9, the CPU 4 returns the emission position changing mask 5 to the initial position, and ends this sequence.

The third embodiment of the present invention will be described next.

Figure 8:
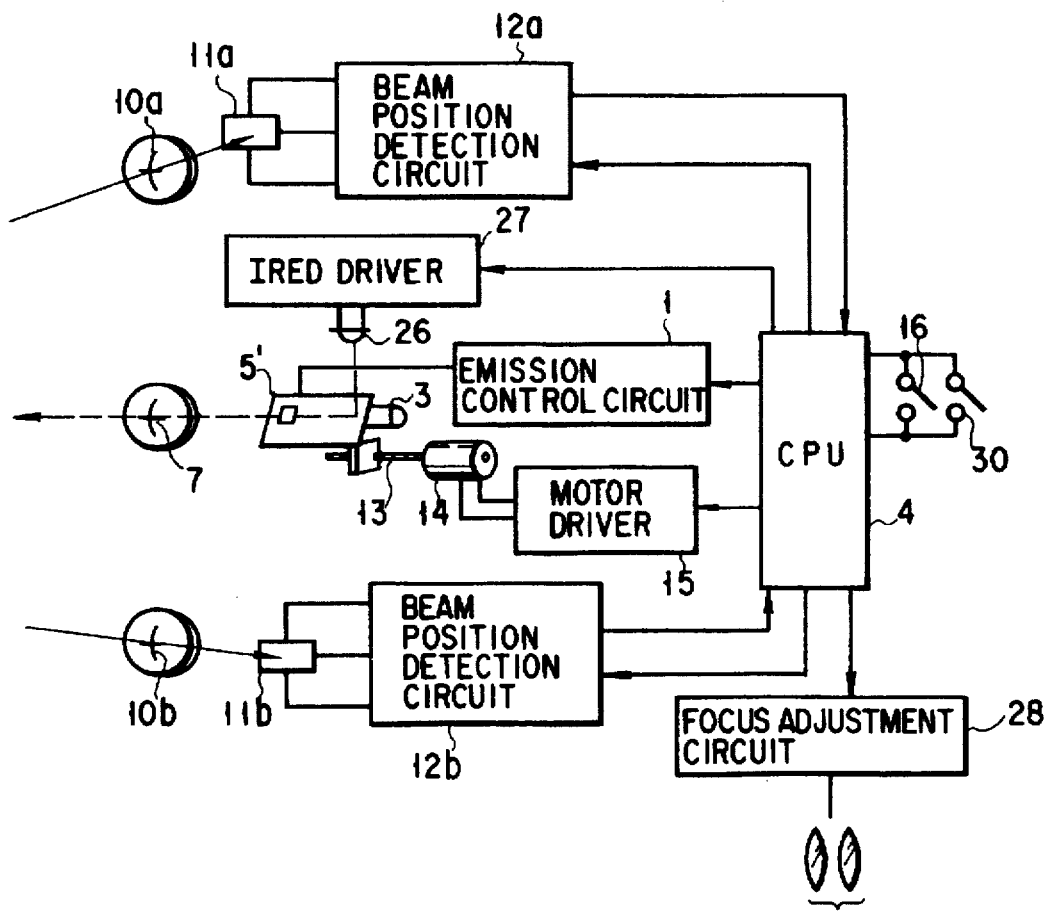
FIG. 8 is a block diagram showing the arrangement of a distance measurement apparatus according to the third embodiment of the present invention.

FIG. 8 shows the arrangement of the third embodiment of the present invention. The basic arrangement of the third embodiment is the same as that shown in FIG. 4 except for the following portions.

In a distance measurement apparatus according to the third embodiment, a mask 5 whose surface has a mirror coating is used instead of the mask 5 in FIG. 4 to allow light from an IRED 26 to be irradiated from a projection lens 7 onto an object to be photographed. The IRED 26 is controlled by a CPU 4 through an IRED driver 27. The IRED 26 in the third embodiment can emit light onto the central portion of a frame. For this reason, a high-intensity light beam need not be emitted from a Xe tube 3 with respect to a human figure as an object located in front of the camera as in the case shown in FIG. 9.

A focus adjustment circuit 28 drives/controls a lens group 29 constituted by a focusing lens, a zoom lens, and the like under the control of the CPU 4. Note that a second (2nd) release switch 30, which is depressed by the photographer in a photographing operation, and a first (1st) release switch 16, which is closed while the release button is depressed to the first stroke position, are connected to the CPU 4.

Figure 10:
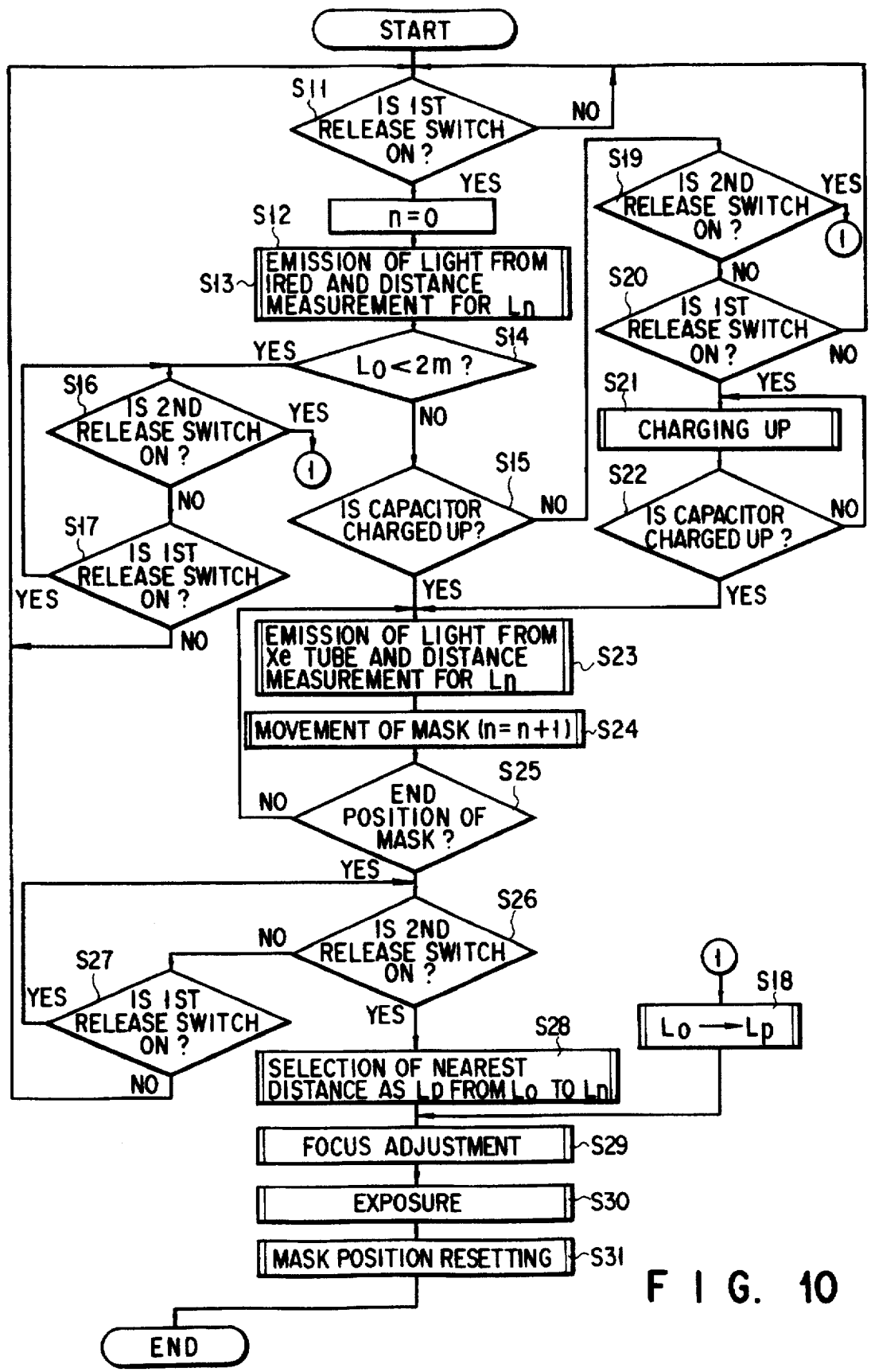
FIG. 10 is a flow chart for explaining the operation of the distance measurement apparatus having the arrangement shown in FIG. 8.

The operation of the third embodiment will be described next with reference to the flow chart of FIG. 10.

First of all, in step S11, the CPU 4 detects that the photographer turns on the 1st release switch 16 and holds the camera to take a photograph. In step S12, the CPU 4 resets the variable representing the distance measurement point before distance measurement. In step S13, the CPU 4 causes the IRED 26 to emit light through the IRED driver 27, and receives currents $I_{OUT1}$ and $I_{OUT2}$ output from light position detection circuits 12a and 12b in accordance with signals obtained by PSDs 11a and 11b. With this operation, the CPU 4 calculates an object distance L, according to equations (1) to (3) above, from the following relationship:

$$L=S \cdot f/[\{(I_{OUT1}+I_{OUT2})/I_0-B\}/A] \tag{4}$$

and sets the distance L in $L_0$.

In step S14, the CPU 4 checks whether the distance $L_0$ is larger than 2 m. If the distance $L_0$ is larger than 2 m, the flow advances to step S15. If the distance $L_0$ is less than 2 m, the flow advances to step S16. If it is determined in step S16 that the 2nd release switch 30 is not turned on, the CPU 4 checks the 1st release switch 16 in step S17. If neither of the 1st and 2nd release switches are turned on, the flow returns to step S11.

In step S15, the CPU 4 checks whether a discharging capacitor (not shown) in an emission control circuit 1 for the Xe tube 3 is charged. If the capacitor is not sufficiently charged, the flow branches to step S19. After checking the release switches in steps S19 and S20, the CPU 4 charges the above capacitor in step S21. This charging operation is continuously performed until it is determined in step S22 that the capacitor is charged up.

If it is determined in steps S16 and S19 that the 2nd release switch 30 is turned on, the CPU 4 does not perform a charging operation, giving priority to a release time lag. The flow then advances to step S18. In step S18, the obtained distance $L_0$ is set in a focus adjustment distance $L_p$, and the flow advances to step S29 to be described later.

If "charging up" is detected in steps S15 and S22, the flow advances to step S23 to start distance measurement while causing the Xe tube 3 to emit light. Similar to the distance measurement using the IRED 26, this distance measurement is performed such that the CPU 4 calculates the distance L, according to equation (4) above, from the outputs $I_{OUT1}$ and $I_{OUT2}$ from the light position detection circuits 12a and 12b in accordance with current signals from the PSDs 11a and 11b.

The subsequent loop from step S24, in which the mask is scanned, to step S25, in which the end position of the mask is detected, is for distance measurement at a plurality of points within a frame, as in the second embodiment. If it is determined in step S25 that the scanning operation is completed, the flow advances to step S26 to detect the state of the 2nd release switch 30.

If it is determined in step S26 that the 2nd release switch 30 is not turned on, the flow advances to step S27 to check the 1st release switch 16. If the 1st release switch 16 is turned on, the flow advances to step S26. Otherwise, the flow returns to step S11.

If it is determined in step S26 that the 2nd release switch 30 is turned on, the flow advances to step S28 to select the nearest object distance from a plurality of obtained distance measurement results ($L_0$ to $L_n$) and set the selected distance in $L_p$. In step S29, the CPU 4 performs focus adjustment with respect to the distance $L_p$. In step S30, the CPU 4 performs exposure (photographing operation) with respect to a photographic film. With this operation, even if the principal object to be photographed (object 8) is not present in the center of the frame, as shown in FIG. 5, the photographer can take a photograph with a human figure as the principal object being in focus.

If it is determined in step S31 that the distance measurement result $L_0$ obtained by the IRED 26 is less than 2 m, the flow does not return to step S23, in which distance measurement is performed upon emission of light from the Xe tube 3, since emission of a large amount of light from the Xe tube 3 is wasteful in terms of energy.

Figure 9:
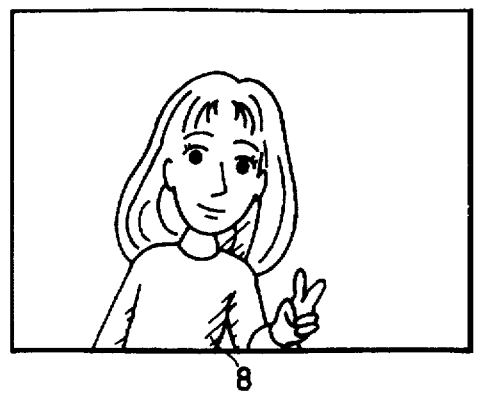
FIG. 9 is a scene in which a human figure as an object or the like is present in front of a camera.

In the third embodiment, when an object to be photographed is in the center of a frame and the object distance is less than 2 m, the probability of a composition like the one shown in FIG. 5 is higher than that of a composition like the one shown in FIG. 9. In this case, only distance measurement at the central portion of the frame is performed.

As described above, in the third embodiment, unnecessary emission of light from the Xe tube 3 is not performed with respect to an object at a near distance to save the energy.

In addition, since the charging operations in steps S21 and S22 need not always be performed, this embodiment also takes countermeasures against a release time lag.

The fourth embodiment of the present invention will be described next.

Figure 11:
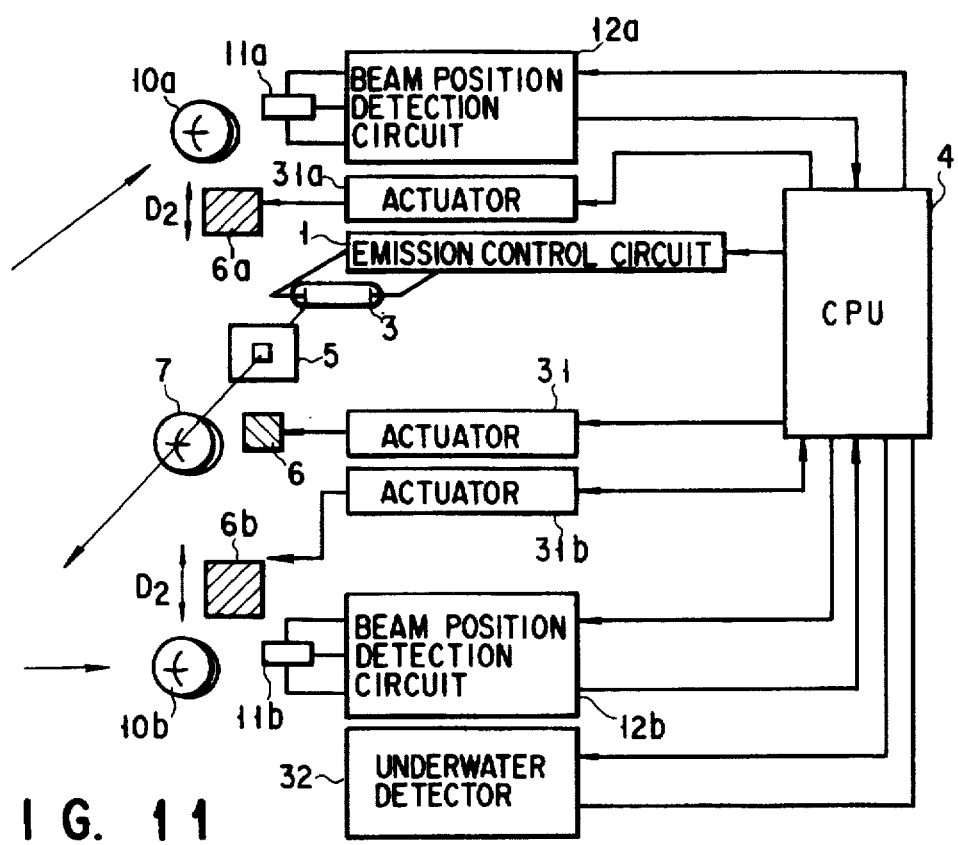
FIG. 11 is a block diagram showing the arrangement of a distance measurement apparatus according to the fourth embodiment of the present invention.

FIG. 11 shows the fourth embodiment of the present invention, specifically the arrangement of an underwater AF device using a large amount of light emitted from a Xe tube.

Water molecules tend to absorb light in the red to infrared regions. For this reason, a projection type AF device has been rarely used in water. However, light in the red to infrared regions can be emitted from an Xe tube upon electric discharge in a light amount 10 times larger than that of light emitted from an IRED or the like, and high-intensity light even in the visible region can be output, as shown in FIG. 2. Because of these characteristics, the application of an Xe tube to an underwater AF device has been considered.

The same reference numerals in FIG. 11 denote the same parts as in the first to third embodiments (FIGS. 1, 4, and 8), and a description thereof will be omitted.

Similar to the arrangement in FIG. 1, a Xe tube 3 is controlled by a CPU 4 through an emission control circuit 1. Light emitted from the Xe tube 3 is irradiated on an object to be photographed through a mask 5 and an projection lens 7. In order to effectively use light in the visible region, a visible light cutting filter 6 is inserted in the optical path of light from the Xe tube 3. The visible light cutting filter 6 can be controlled by the CPU 4 through an actuator 31 to be inserted/withdrawn in/from the optical path.

For the same reason as described above, visible light cutting filters 6a and 6b which can be moved in the direction indicated by an arrow $D_2$ are inserted in the optical path on the light-receiving side. The visible light cutting filters 6a and 6b are controlled by the CPU 4 through actuators 31a and 31b to be inserted/withdrawn in/from the optical path on the light-receiving side.

In addition, if it is determined on the basis of an output from an underwater detector 32 that the distance measurement apparatus is in water, the CPU 4 withdraws the visible light cutting filters 6, 6a, and 6b from the optical paths of signal light beams through the actuators 31, 31a, and 31b. As a result, when the photographer performs a photographing operation, emission and reception of light including light having wavelengths which do not allow easy absorption of light in water are performed. Distance measurement therefore can be performed up to a distance at which distance measurement cannot be performed by a conventional underwater distance measurement scheme using only infrared light.

On land, each visible light cutting filter is inserted in the optical path of a corresponding light beam. On the light-emitting side, this operation prevents an object to be measured from being dazzled. On the light-receiving side, the operation serves to reduce visible light noise such as sunlight.

Figure 12:
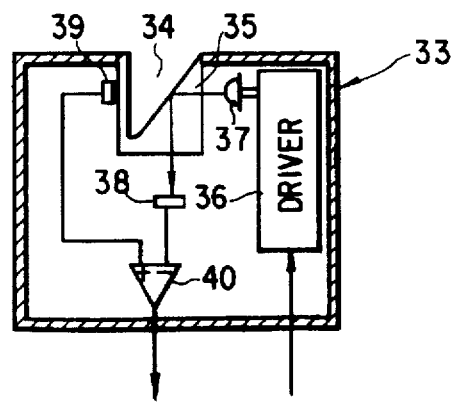
FIG. 12 is a view showing the detailed arrangement of an underwater detection device in FIG. 11.

FIG. 12 shows the detailed arrangement of an underwater detector 32 in FIG. 11.

Referring to FIG. 12, the outside of the underwater detector 32 is covered with a waterproof wall surface 33. A recess portion 34 is formed in part of the wall surface 33, and a prism 35 is arranged inside the recess portion 34. When an IRED 37 is caused to emit light through a driver 36, the light is received by two light-receiving elements (photodiodes; PDs) 38 and 39. The magnitudes of outputs from the two light-receiving elements 38 and 39 are compared with each other by a comparator 40.

As shown in FIG. 12, an optical path is formed between the IRED 37 and the PD 38 under the condition of the total reflection surface of the prism 35. For this reason, in a normal state, light from the IRED 37 is not incident on the PD 39. If, however, water enters the recess portion 34, since the condition of the total reflection surface is not satisfied, the amount of light emitted from the IRED 37 and incident on the PD 38 decreases. In contrast to this, the amount of light emitted from the IRED 37 and incident on the PD 39 increases. For this reason, the comparator 40 outputs an "H" signal which is set at high level when the camera is in water.

As described above, in the fourth embodiment, the positions of the visible light cutting filters 6, 6a, and 6b are switched depending on whether the camera is in water or on land. As in the first to third embodiments described above, signal light beams emitted from the Xe tube 3 through the mask 5 and the projection lens 7 are reflected by an object (not shown), the reflected light beams are incident on the PSDs 11a and 11b through the light-receiving lenses 10a and 10b, and the CPU 4 calculates the object distance L from the signal light positions according to equation (4).

As described above, in the fourth embodiment, distance measurement can be performed with high precision either in water or on land.

As described above, according to the first to fourth embodiments, there is provided a distance measurement apparatus which can solve the problem associated with fine movement of the emission point of a xenon tube and can perform high-precision distance measurement even at a long distance without being influenced by the size of an object to be photographed and changes in the amount of light emitted from a Xe tube.

The fifth embodiment of the present invention will be described next with reference to the accompanying drawings.

FIG. 13 shows the arrangement of a camera according to the fifth embodiment of the present invention.

Referring to FIG. 13, a distance measurement section 102 for measuring the distance to an object to be photographed and an underwater detection section 103 for detecting whether the camera is used in water or in air (on land) are connected to a CPU (Central Processing Unit) 101 as an arithmetic operation control circuit constituted by a one-chip microcomputer and the like. In addition, an electronic flash section 104 and an exposure control section 105 are connected to the CPU 101. The electronic flash section 104 emits light to assist in performing exposure when correct exposure cannot be attained within a predetermined exposure time because of low brightness. The exposure control section 105 is constituted by a shutter and the like and used to perform exposure control of the camera.

In the camera having the above arrangement, the CPU 101 controls the electronic flash section 104 and the exposure control section 105 on the basis of an output result from the underwater detection section 103.

FIG. 14 is a graph showing the light absorption characteristics of seawater.

As shown in FIG. 14, light is absorbed in water with an absorption coefficient α exhibiting wavelength dependence. As a result, the light is attenuated.

That is, when a photographing operation is performed in the electronic flash mode in water, flash light is absorbed unlike in air. For this reason, even with a proper amount of light for an object in air, the same object at the same distance cannot be properly illuminated in water.

In the fifth embodiment, therefore, with the arrangement shown in FIG. 13, the underwater detection section 103 is used to detect whether the camera is used in water, and a dimming control means for the electronic flash section 104 is switched.

Let L be the distance to an object to be photographed (object distance) in air, and $FN_0$ be the f-number of the camera in a photographing operation, then the guide number (to be referred to as $GN_0$ hereinafter) representing the amount of light emitted from the electronic flash section 104 is considered proper when the following relationship is established:

$$GN_0 = FN_0 \times L \qquad (5)$$

In this case, the film speed is assumed to be ISO100. ISO stands for the International Organization for Standardization, and ISO100 is the photographobtained by the photographic sensitometry method determined by ISO.

In the camera incorporating the electronic flash device, the CPU 101 controls the electronic flash section 104 in accordance with the object distance L and the f-number $FN_0$ such that flash light satisfies equation (5).

According to a characteristic feature of the fifth embodiment, in performing a photographing operation in water, a dimming operation is performed in consideration of the light absorption coefficient α in water.

Assume that when light of a light amount $P_0$ is projected to an object in water, the amount of light reflected by the object at the object distance L is $P_1$. The relationship between these light amounts is expressed by:

$$P_1 = P_0 \cdot e^{-\alpha L} \qquad (6)$$

When flash light is to be emitted in water, $GN_0$ must be set as follows according to equations (5) and (6) in consideration of the forward optical path of projected light and the backward optical path of reflected light:

$$GN_0 = FN_0 \times L \times e^{2\alpha L} \qquad (7)$$

In the amphibious camera having the electronic flash device according to the fifth embodiment, a dimming operation in air is performed according to equation (5), whereas a dimming operation in water is performed according to equation (7). In this case, the above absorption coefficient α can be set to be in the neighborhood of 0.1, as shown in FIG. 14, in consideration of the wavelength of flash light.

Many so-called lens shutter cameras have a mechanism serving both as a stop and a shutter. In this method, a known dimming method is used, in which flash light with a predetermined value of $GN_0$ is emitted at the timing when the shutter is set to a predetermined f-number. In the above lens shutter camera using such a dimming method as well, a dimming operation can be performed according to equation (7) in water.

A dimming operation in the fifth embodiment can be performed by using either the above control scheme of controlling $GN_0$ or the control scheme of emitting flash light with a predetermined value of $GN_0$ at a predetermined f-number $FN_0$. These schemes may be selected in accordance with the arrangement of a camera used.

A camera according to the sixth embodiment of the present invention will be described next.

Figure 15:
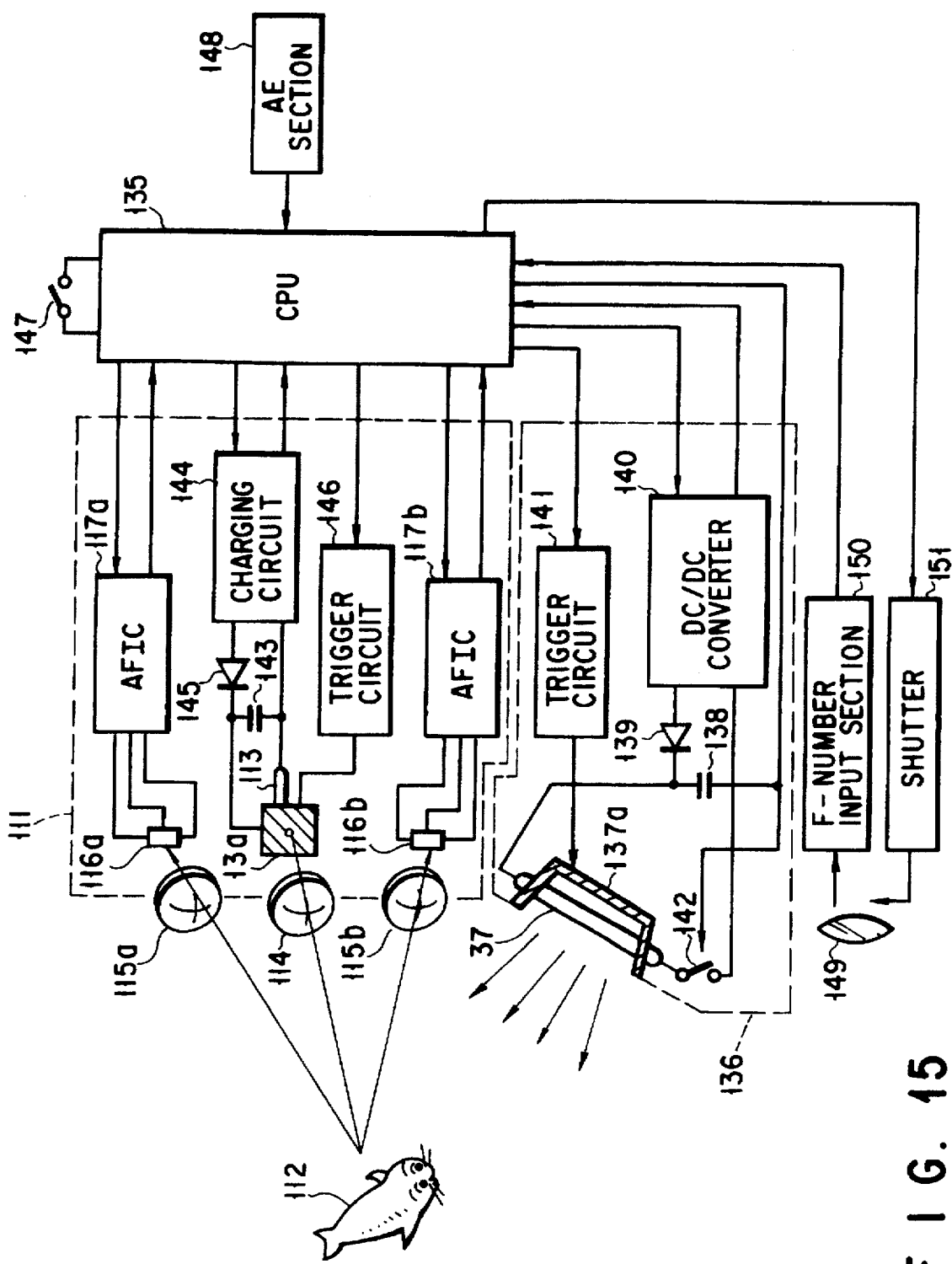
FIG. 15 is a block diagram showing the arrangement of a camera according to the sixth embodiment of the present invention.

FIG. 15 shows the arrangement of a camera according to the sixth embodiment.

In the sixth embodiment, a distance measurement/ underwater detection section 111 projects distance measurement light onto an object 112 to be photographed, and the object distance is detected in accordance with light reflected by the object. This embodiment uses a so-called projection type active autofocus (AF) scheme. As shown in FIG. 14, since infrared and ultraviolet rays exhibit large absorption coefficients α in water, the sixth embodiment uses a xenon discharge lamp (to be referred to as a Xe tube) 113 as a light source, which emits visible light components in large amounts.

A mask 113a having a small window and a projection lens 114 are arranged in front of the Xe tube 113 to focus/project distance measurement light within a narrow range.

Light beams reflected by the object 112 are respectively incident on semiconductor light position detection elements (PSDs) 116a and 116b through two light-receiving lenses 115a and 115b.

FIG. 16 shows an optical system including the above light-projecting and light-receiving systems.

According to the principle of trigonometric distance measurement, as the object distance L decreases, incident positions X1 and X2 exhibit large values. Let S1 and S2 respectively be the distances between the projection lens 114 and the light-receiving lenses 115a and 115b, and $f_j$ respectively be the distances between the light-receiving lenses 115a and 115b and the PSDs 116a and 116b when distance measurement is performed with respect to an object at the distance L. Then, the above incident positions X1 and X2 are given by:

$$X1 = S1 \cdot f_J/L, \quad X2 = S2 \cdot f_J/L \tag{8}$$

Note that light is emitted from the Xe tube 113 upon electric discharge in air. For this reason, the electric discharge path changes for each emission of light. As shown in FIG. 16, therefore, a light beam to be projected as indicated by a solid line A according to the design may be inclined as indicated by a broken line B depending on the conditions in a light-emitting operation.

As shown in FIG. 16, however, if a distance measurement calculation is performed by using the method of preparing two light-receiving systems and adding the incident positions X1 and X2, the inclination of the light beam emitted in the above manner can be corrected. That is, with a distance measurement calculation using equation (9):

$$L = (S1+S2) \cdot f_J/(X1+X2) \tag{9}$$

errors ΔX1 and ΔX2 in FIG. 16 cancel out each other to allow proper distance measurement regardless of whether the light beam is projected in the direction indicated by the solid line A or the broken line B.

The PSDs 116a and 116b are semiconductor elements for outputting two current signals dependent on the incident position and amount of incident light. Autofocus integrated circuits (to be referred to as AFICs hereinafter) 117a and 117b in FIG. 15 are integrated circuits for processing the above current signals in an analog manner.

FIG. 17 is a block diagram showing a circuit in the AFIC 117a.

The PSD 116a outputs current signals $I_1$ and $I_2$, which satisfy the following relationship owing to the carrier dividing effect of the PSD 116a:

$$I_1/(I_1+I_2) = X \tag{10}$$

where X is the incident position of the light.

These current signals $I_1$ and $I_2$ are respectively amplified β times by preamplifiers 118 and 119 and transistors 120 and 121. Note that β is the current amplification factor of each of the transistors 120 and 121.

The currents amplified β times are added together by a current mirror circuit constituted by pairs of transistors 122 and 123, and 124 and 125. The result current is input to an integrating circuit 126 to be integrated. As described above, the integrating circuit 126 outputs a signal dependent on the current signal sum $I_1+I_2$ from the PSD 116a. Note that this current signal sum $I_1+I_2$ is dependent on the amount of light incident on the PSD 116a.

The current signals $I_1$ and $I_2$ amplified in the form of the collector currents of the transistors 120 and 121 are respectively input to compression diodes 127 and 128. The currents from the compression diodes 127 and 128 are respectively input to the bases of transistors 132 and 133, which have a common emitter and are connected to a constant current source 131, through buffers 129 and 130.

Let $I\phi$ be the current flowing in the constant current source 131 and $I_{OUT}$ be the current flowing in a resistor 134, then $$I_{OUT} = \{I_1/(I_1+I_2)\} \cdot I\phi \tag{11}$$

When, therefore, a CPU 135 in FIG. 15 reads a voltage output generated across the resistor 134 through an analog/digital (A/D) converter (not shown) incorporated in the CPU 135, the incident position X of the light can be obtained according to equations (10) and (11). The CPU 135 detects the incident positions X1 and X2 and the amounts of the reflected signal light beams from the outputs from the AFICs 117a and 117b having the above function.

With substitutions of the incident positions X1 and X2 into equation (9), since S1, S2, and $f_J$ are values which have already been determined, the object distance L can be obtained in consideration of the refractive index of water. The above description is associated with the operations of the distance measurement/underwater detection section 111 and the CPU 135 of the sixth embodiment.

Let P be the reflected signal light amount. Then, the following relationship is established between the reflected signal light amount P and the object distance L in air when the object has a predetermined refractive index:

$$P = P_0/L^2 \tag{12}$$

where $P_0$ is a proportionality constant.

In contrast to this, in consideration of the attenuation constant α of water, the reflected signal light amount P in water is given by $$P = P_0 \cdot e^{-\alpha L}/L^2 \tag{13}$$

In this case, the attenuation coefficient α is a value which changes depending on the salt concentration of water and the like.

In the sixth embodiment, the attenuation constant α can be calculated by using the reflected signal light amount P and the object distance L as follows:

$$\alpha = -1/L \cdot \ln(P \cdot L^2/P_0) \tag{14}$$

Subsequently, the CPU 135 substitutes the calculated attenuation constant α into equation (7) to control an electronic flash section 136. The electronic flash section 136 is designed to irradiate light from a Xe tube 137 through a reflector 137a. The Xe tube 137 emits light upon discharging a capacitor 138. The capacitor 138 is charged by a boosting DC/DC converter 140 through a rectifier diode 139. A high voltage is applied from a trigger circuit 141 to the Xe tube 137. As a result, the gas in the Xe tube 137 is ionized, and the Xe tube 137 starts emitting light.

An electric discharge loop has a switch 142, which is turned on/off by the CPU 135 to change the emission time of the Xe tube 137 of the electronic flash section 136, thereby controlling the amount of light emitted, i.e., $GN_0$.

Emission of light from the autofocus Xe tube 113 is also controlled according to the same principle of emission of light as that of the Xe tube 137 of the electronic flash section 136 for exposure control. This system includes a capacitor 143 for storing charges to be discharged, a charging circuit 144 for charging the capacitor 143, and a rectifier diode 145. The CPU 135 controls emission of light from the autofocus Xe tube 113 through a trigger circuit 146.

The CPU 135 also detects the ON/OFF state of a release switch 147 interlocked with the release button of the camera, and detects the brightness of an object to be photographed through an AE (Automatic Exposure) section 148.

Information representing the f-number of a photographing lens 149 is also input to the CPU 135 through an f-number input section 150 constituted by an encoder and the like. The CPU 135 controls a shutter 151 and the like on the basis of these pieces of information to control the photographing sequence.

FIG. 18 shows the outer appearance of the camera according to the sixth embodiment.

As shown in FIG. 18, the projection lens 114 and the light-receiving lenses 115a and 115b which are used for an autofocus operation, the Xe tube 137 as the electronic flash section, the release switch 147 interlocked with the release button, the photographing lens 149, a grip portion 161, a window 162 for allowing an AE sensor to detect the brightness of an object to be photographed, and an objective lens 163 of the viewfinder are arranged on a camera body 160. The objective lens 163 of the above viewfinder is used in water and hence is larger than that of a general camera.

Assume that the camera body 160 is designed to have a waterproof, pressure-resistant structure to ensure underwater use, and the AE section 148 (not shown) for distance measurement has a correction function to obtain a proper exposure value even in water entirely in blue.

It is generally believed that distance measurement light for an autofocus operation or flash light does not reach an object to be photographed in water because of attenuation of the light. When, however, underwater photographs are checked, it is found that many photographs are like those shown in FIGS. 19A and 19B. In general, in consideration of the poor transparency of water and the like, the probability that objects at distances of 5 m or more are photographed in water, as in the case of group photography on land, is not high.

Assume that the absorption coefficient $\alpha$ of visible light is 0.1 according to the characteristic curve in FIG. 14, which represents the relationship between the wavelength of light and the absorption coefficient. In this case, for a scene like the one shown in FIG. 19A, a wide-angle lens is used, and the object distance L is about 1.5 m. According to equation (7), therefore, $FN_0=2.8$, and $GN_0$ is given by:

$$GN_0 = 2.8 \times 1.5 \times e^{2 \cdot 0.1 \cdot 1.5}$$
$$= 4.2 \times 1.35 = 5.7$$

As is apparent, a photographing operation in water can be satisfactorily performed with an electronic flash device having $GN_0$ of about 8 and incorporated in a general compact camera.

Figure 20A:
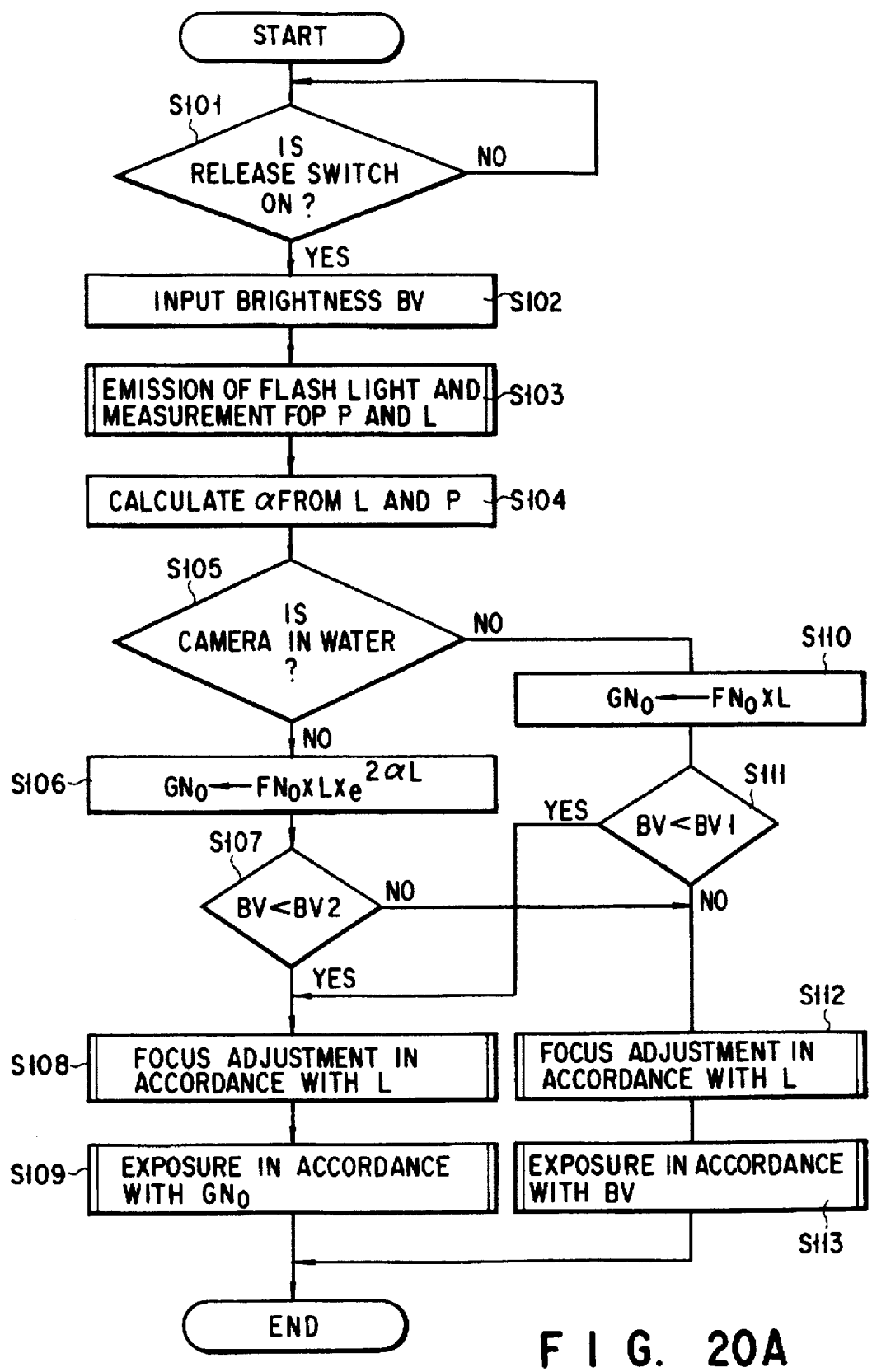
FIGS. 20A and 20B are flow charts showing processing to be performed by a CPU 135 in photographing operations in the camera (amphibious camera) of the sixth embodiment and its modification.

FIG. 20A is a flow chart showing the processing performed by the CPU 135 in the camera (amphibious camera) of the sixth embodiment when a photographing operation is to be performed.

In step S101, the CPU 135 checks whether the release switch 147 is turned on upon depression of the release button. If YES in step S101, it is determined that the photographing sequence has started, and the flow advances to step S102.

In step S102, the CPU 135 obtains a brightness BV of an object (to be photographed) by using an output from the AE section 148.

In step S103, after causing the autofocus Xe tube 113 to emit light, the CPU 135 receives outputs from the PSDs 116a and 116b through the AFICs 117a and 117b, and detects the object distance L by distance measurement and the reflected signal light amount P. This detection in step S103 has been described with reference to FIG. 17, and hence a description thereof will be omitted.

In steps S104 and S105, the CPU 135 checks through the distance measurement/underwater detection section 111 whether the camera is in water. In the sixth embodiment, as described with reference to FIG. 14, whether the camera is in water is determined by using the tendency that light is greatly attenuated in water. In step S104, the CPU 135 calculates the absorption coefficient $\alpha$ according to equation (14). In this case, the CPU 135 determines that the camera in water, if the absorption coefficient $\alpha$ is about 0.01.

Note that the absorption coefficient $\alpha$ may become about 0.01 even in air (on land) depending on the tone of color of an object to be photographed. In order to improve the accuracy in determination, the mask 113a may be designed to be movable to allow projection of light onto a plurality of points within a frame, and it may be determined that the camera in water, only when the detection results at the respective points consistently exhibit an absorption coefficient $\alpha$ of about 0.01.

If distance measurement can be performed at a plurality of points within a frame, the following effect can also be obtained. Even if an object to be photographed is present at a position other than the center of a frame as shown in FIG. 19B, correct focus adjustment can be performed.

In step S105, the CPU 135 checks, on the basis of the value of the absorption coefficient $\alpha$ calculated in step S104, whether the camera is in water. If YES in step S105, the flow advances to step S106 to calculate $GN_0$ in consideration of the light absorption coefficient $\alpha$ according to equation (7).

If NO in step S105, the CPU 135 branches to step S110 to calculate $GN_0$ according to equation (5). For the sake of descriptive convenience, in the sixth embodiment, the film speed of a film to be used is assumed to be ISO100. If a film of ISO400 is used, $GN_0$ may be ½ the calculation result based on equation (5).

In step S107 or S111, the CPU 135 checks whether the brightness BV of the CPU 135 is lower than predetermined level BV2 or BV1. If YES in step S107 or S111, the flow branches to step S108 to perform focus adjustment in accordance with the object distance L obtained by distance measurement in step S103.

In step S109, the CPU 135 causes the Xe tube 137 of the electronic flash section 136 to emit light and controls the shutter 151 to perform exposure in accordance with $GN_0$ calculated in step S106 or S110.

If it is determined in step S107 or S111 that the brightness BV of the object is not lower than the predetermined level BV2 or BV1, i.e., the brightness of the object is sufficiently high for a photographing operation, the flow branches to step S112 to perform focus adjustment in accordance with the object distance L obtained by distance measurement in step S103.

In step S113, the CPU 135 performs exposure control by keeping the shutter 151 open for a predetermined period of time without controlling the electronic flash section 136.

As described above, in the sixth embodiment, since the distance measurement/underwater detection section 111 serves as both a distance measurement section and an underwater detection section, a simple, inexpensive camera can be provided.

In addition, the operation of the electronic flash section 136 is switched in accordance with the brightness of an object to be photographed, and the determination levels BV1 and BV2 in determination steps S107 and S111 are changed depending on whether the camera is in water or in air (on land). Therefore, in water where the camera is difficult to hold firmly, and camera shakes tend to occur, emission of flash light is controlled to occur as often as possible, thus taking countermeasures against camera shakes.

For this purpose, the determination level BV2 is set to be higher than the determination level BV1. With this setting, even if the object brightness in water is the same as that in air, and the Xe tube 137 of the electronic flash section 136 need not be caused to emit light in air, the Xe tube 137 is caused to emit light in water.

In the sixth embodiment, a light source having the same wavelength distribution as that of exposure flash light emitted from the Xe tube 137 is used for an autofocus operation, and the light absorption coefficient a is calculated from the object distance L and the reflected signal light amount P for each photographing operation. With this operation, according to the camera of this embodiment, $GN_0$ can be finely controlled in accordance with the state of water, and a photographing operation with correct exposure can be automatically performed regardless of the state of water, i.e., seawater or fresh water.

In addition, the photographing sequence may be simplified in such a manner that whenever it is determined that the camera is used in water, the Xe tube 137 of the electronic flash section 136 is caused to emit a predetermined amount of light.

As shown in FIG. 16, two light-receiving systems constituted by the light-receiving lenses 115a and 115b, the PSDs 116a and 116b and the like are prepared to correct the offsets of reflected signal light beams, thereby taking countermeasures against directivity errors of beams, i.e., projected light beams, in an autofocus operation with emission of flash light. Correct distance measurement therefore can be performed.

The underwater detection section in the sixth embodiment may use a method of checking, on the basis of the difference in refractive index between water and air, whether the camera is in water (see FIG. 21), a method of checking, on the basis of the difference in resistance between water and air, whether the camera is in water, or the like.

Figure 20B:
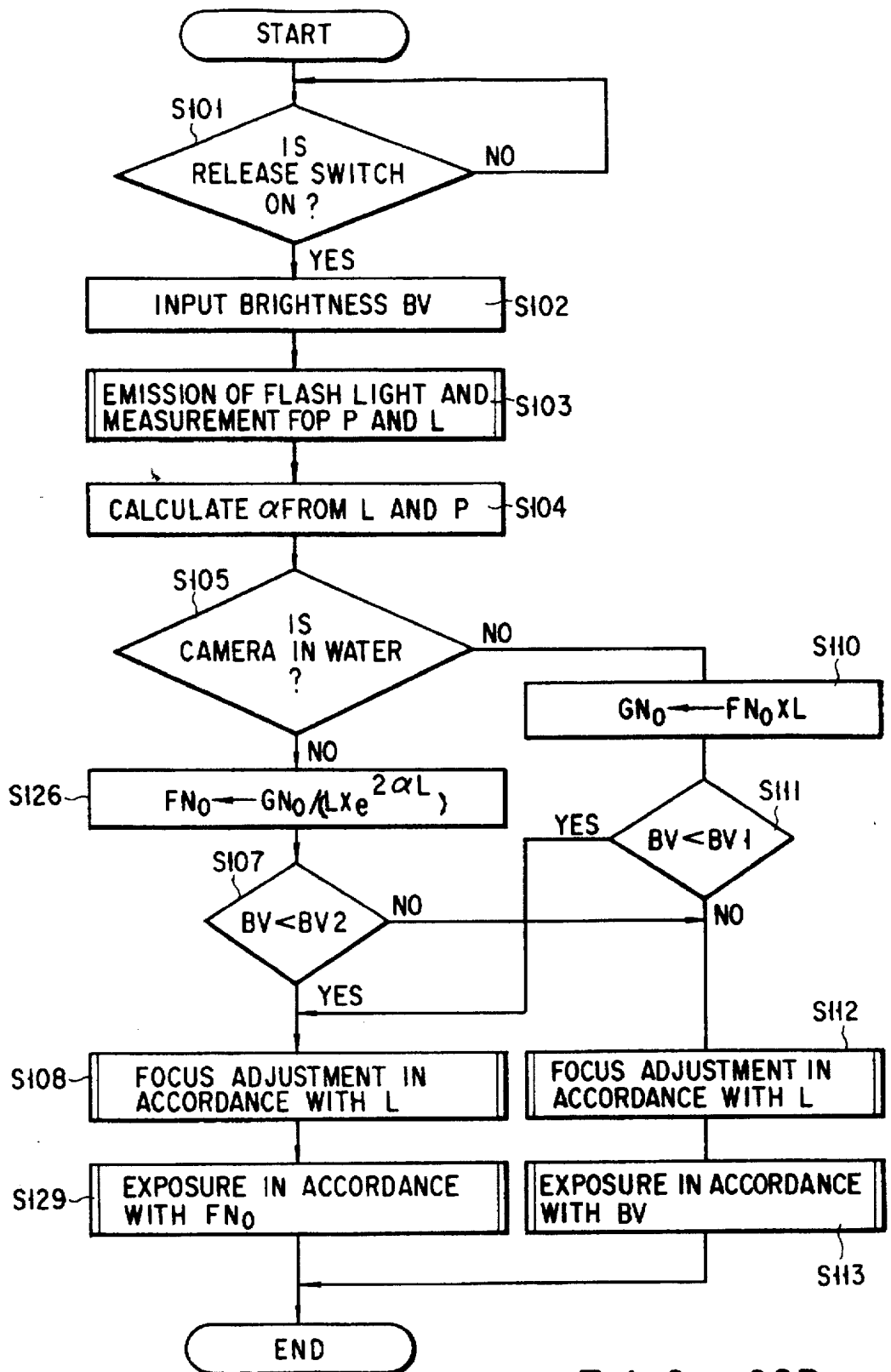

In the sixth embodiment, the amount of light to be emitted (guide number $GN_0$) is calculated according to equation (7) in consideration of the object distance and the attenuation ratio, thereby controlling the amount of light to be emitted from the electronic flash device. However, the f-number $FN_0$ may be controlled by modifying equation (7). This modification will be described with reference to FIG. 20B.

In step S126, the f-number $FN_0$ for correct exposure is calculated according to $GN_0/(L \cdot e^{2\alpha L})$ by using the predetermined guide number $GN_0$ and the object distance L and the attenuation ratio $\alpha$ calculated in steps S103 and S104. In step S129, the electronic flash device is caused to emit light in accordance with the f-number $FN_0$ calculated in step S126 and the predetermined guide number $GN_0$, thereby attaining correct exposure. Assume that a camera having a sector shutter which serves as both a stop and a shutter and gradually opens is used. In this case, the electronic flash device may be caused to emit light at the timing when the calculated f-number $FN_0$ is set. In addition, if a stop and a shutter are arranged as discrete components, the stop may be set to the above f-number $FN_0$, and the electronic flash device may be caused to emit light at a synchronized timing.

Since this sequence is the same as that in FIG. 20A except for steps S126 and S129, a detailed description thereof will be omitted.

A camera according to the seventh embodiment of the present invention will be described next.

Figure 21:
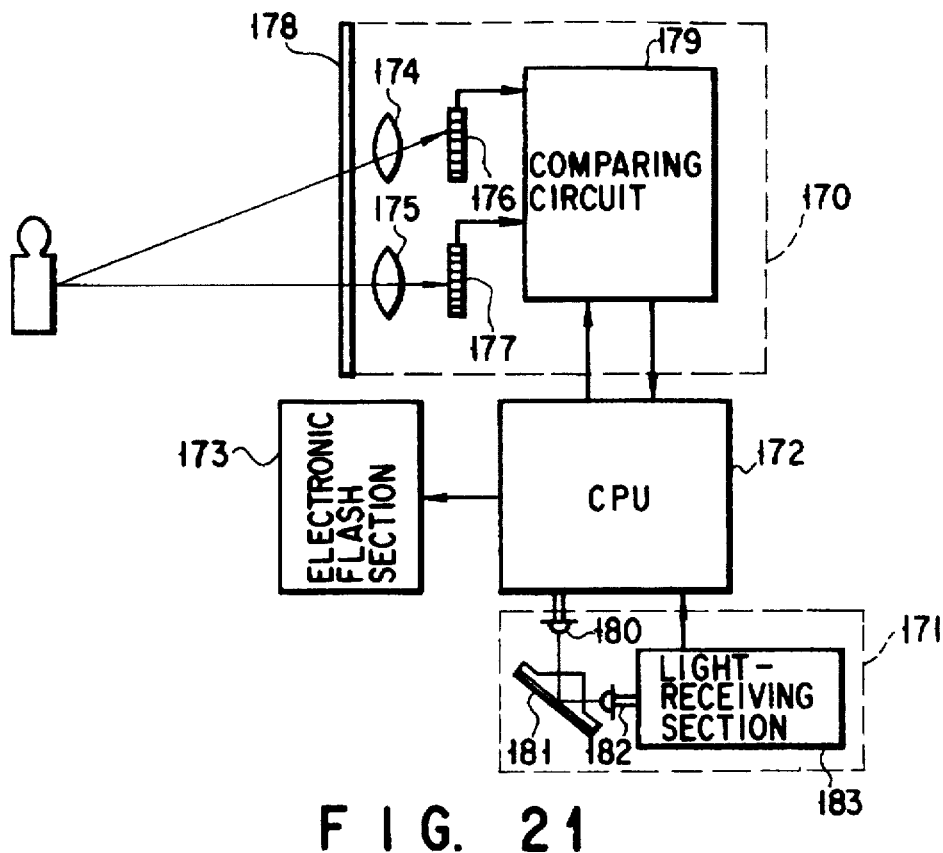
FIG. 21 is a block diagram showing the arrangement of the main part of a camera according to the seventh embodiment.

FIG. 21 shows the arrangement of the main part of the camera according to the seventh embodiment of the present invention.

In the camera of the seventh embodiment, a passive autofocus scheme is used for a distance measurement section, and the critical angle of a prism is applied to an underwater detection section. The main part of this camera of the present invention is constituted by a distance measurement section 170, an underwater detection section 171, a CPU 172, and an electronic flash section 173. Since other arrangements are the same as those of the sixth embodiment, a description thereof will be omitted.

The distance measurement section 170 comprises light-receiving lenses 174 and 175 for an autofocus operation, sensor arrays 176 and 177, a cover glass 178, and a comparing circuit 179. This comparing circuit 179 is a circuit for comparing the positional relationships of the densities of images on the sensor arrays 176 and 177. The comparing circuit 179 outputs the comparison result to the CPU 172. The CPU 172 obtains an object distance from the comparison result. With this arrangement, the distance measurement section 170 can perform distance measurement based on the principle of trigonometric distance measurement without emitting distance measurement light.

The underwater detection section 171 causes light emitted from a light-emitting element 180 to be incident on a light-receiving element 182 by using the critical angle of a prism 181, and detects this incident light through a light-receiving section 183. In this case, when water comes into contact with the surface of the prism 181 during an underwater photographing operation, the condition for the critical angle of the prism 181 is no longer satisfied, and no optical coupling occurs. As a result, the light incident on the light-receiving element 182 changes. The CPU 172 detects a difference in intensity due to this change in incident light through the light-receiving section 183 to check whether the camera is in water.

The CPU 172 performs control to change the amount of light to be emitted from the electronic flash section 173 in accordance with an object distance L and whether the camera is used in water.

Figure 22:
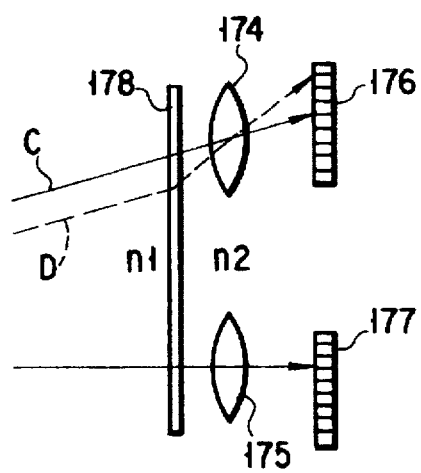
FIG. 22 is a view showing how the incident angle of a light beam changes owing to the difference in refractive index between water and air with a cover glass 178 serving as the boundary therebetween.

A light beam which is incident on the sensor array 176 as indicated by "C" in FIG. 22 is incident on the sensor array 176 in water as indicated by "D" in FIG. 22 because of the difference in refractive index between water and air with the cover glass 178 serving as the boundary between water and air.

This means that even with the same object distance, the distance measurement data changes depending on whether the camera is in water or in air, according to the law of refractive index. In brief, since the ratio between a refractive index $n_1$ of water and a refractive index $n_2$ of air is $n_2/n_1 = \frac{3}{4}$, an object distance $L_W$ in water is obtained as follows from a distance measurement result L:

$$L_W = (\tfrac{3}{4}) \cdot L \qquad (15)$$

The same applies to the case wherein the method of determining, on the basis of the difference in refractive index between water and air, whether the camera is used in water, in the sixth embodiment in FIG. 15.

As described above, in the seventh embodiment, unlike the sixth embodiment in FIG. 15, since only two lenses for an autofocus operation are required, the degree of freedom of camera layout increases. In addition, since no energy for emission of light is required for distance measurement, an energy-saving design can be realized.

As described above, according to the fifth to seventh embodiments, there is provided an amphibious camera having a simple arrangement, which allows the user to enjoy photographing operations both in water and in air (on land) while correct exposure is automatically performed.

According to the fifth to seventh embodiments of the present invention, there are provided cameras having the following arrangements:

(1) a camera including an underwater discrimination means for discriminating whether the camera is used in water, and an electronic flash means for projecting auxiliary illumination light onto an object to be photographed in a photographing operation, characterized by comprising a dimming operation means for changing the amount of light emitted from the electronic flash means in accordance with an output from the underwater discrimination means;

(2) the camera described in (1), which is characterized by comprising a distance measurement means for projecting a distance measurement light beam onto an object to be photographed, and measuring the distance to the object on the basis of light reflected by the object, a light amount measurement means for measuring the amount of the reflected light, and a calculation means for obtaining a light attenuation ratio in water on the basis of the distance measurement result obtained by the distance measurement means and the light amount measurement result obtained by the light amount measurement means, wherein the dimming operation means controls the electronic flash means in accordance with the light attenuation ratio;

(3) a camera including an underwater discrimination means for discriminating whether the camera is used in water, and an electronic flash means for projecting auxiliary illumination light onto an object to be photographed in a photographing operation, characterized by comprising a brightness detection means for determining an object brightness, and a decision means for deciding an operation of the electronic flash means by comparing the object brightness with a predetermined determination level, wherein the determination level of the decision means is changed in accordance with an output from the underwater discrimination means; and (4) the camera described in (1), which is characterized in that an optical correction member is inserted in the optical path of a photographing optical system in response to a characteristic signal.

As described above, according to the fifth to seventh embodiments of the present invention, there is provided a camera capable of easily taking an underwater photograph with good reproducibility.

A camera according to the eighth embodiment of the present invention will be described next.

FIG. 23 shows the arrangement of the camera of the eighth embodiment.

This camera comprises a CPU (Central Processing Unit) 201 constituted by a one-chip microcomputer and the like and used to control the overall operation of the camera, underwater determination measurement sections 202 and 203 for checking whether the is used in water, and measuring the distance to the object, a magnetic g section 205 for magnetically recording information on a film 204, and an electronic flash section 206 for emitting flash light for compensating for red when a photographing operation is to be performed in water by using a film having no magnetic recording area.

In the above arrangement, the CPU 201 receives determination information from the underwater determination/distance measurement sections 202 and 203 for checking whether the camera is used in water. If this determination information indicates that the camera is used in water, the CPU 201 magnetically records, on the film 204, information indicating that the corresponding frame is obtained by an underwater photographing operation. Note that the above information need not be recorded by a magnetic recording scheme and may be recorded by an optical recording scheme or the like. In the underwater determination/distance measurement sections 202 and 203, when a xenon discharge lamp (to be referred to as a Xe tube hereinafter) 220 is caused to emit light, the light is projected as distance measurement light onto an object 223 to be photographed through a mask 221 having a window and a projection lens 222. An emission circuit 224 is constituted by a circuit for charging energy for causing the Xe tube 220 to discharge, and outputting a trigger to the Xe tube 220, and the like.

The reflected signal light reflected by the object 223 is incident on two sensors 227 and 228 through a light-receiving lens 225 and a dichroic mirror 226 having selective transmittance characteristics based on wavelengths. The dichroic mirror 226 transmits infrared light and reflects visible light. With this dichroic mirror 226, the infrared light component of the reflected signal light is incident on the sensor 227, and the visible light component is incident on the sensor 228. Therefore, an output from the sensor 227 is dependent on the intensity of the infrared light component, and an output from the sensor 228 is dependent on the intensity of the visible light component.

As shown in FIG. 14, the infrared light component has strong absorption characteristics in water, and hence is greatly absorbed, whereas the visible light component is absorbed in a relatively small amount. If, therefore, this camera is used in water or in air, the ratio between the infrared light component and the visible light component abruptly changes. When, therefore, outputs from the two sensors 227 and 228 are small, it can be determined that the camera is used in water. When the outputs are large, it can be determined that the camera is used in air. In such a manner, underwater detection can be performed.

Since the projection lens 222 and the light-receiving lens 225 are spaced apart from each other by a predetermined base length, the incident angle of reflected signal light on the light-receiving lens 225 changes on the basis of the principle of trigonometric distance measurement. As the incident angle changes, the incident position of the reflected signal light on the sensor 228 changes. By detecting this incident position, therefore, the distance to the object 223 can be detected. For this reason, the sensor 228 must have a light position detecting function.

As a semiconductor element having such a light position detecting function, a semiconductor light position detection element (to be referred to as a PSD hereinafter) is available. The PSD is a semiconductor element for outputting two signal currents dependent on the incident position of light on the PSD. An autofocus integrated circuit (to be referred to as an AFIC hereinafter) 229 amplifies these signal currents and outputs signals dependent on the incident position of the light.

The AFIC 229 has a function of outputting a signal dependent on the total signal amount of outputs from the sensors 227 and 228. The CPU 201 performs underwater determination and distance calculation on the basis of these results according to the above-described concept.

The electronic flash section 206 is designed to selectively cause two Xe tubes 230 and 231 to emit light under the control of the CPU 201. A red filter 232 is arranged in front of the Xe tube 231. A selective emission section 233 is constituted by a circuit for charging the Xe tubes 230 and 231 to cause electric discharge, and high-voltage triggers the Xe tubes 230 and 231, and the like.

The CPU 201 writes information on a magnetic recording area on the film 204 by using a magnetic head 205a through the magnetic recording section 205, performs focal position control of a photographing lens 235 by using a driver 234, performs exposure control by using a shutter 236, and controls the overall sequence of the camera.

Figure 24:
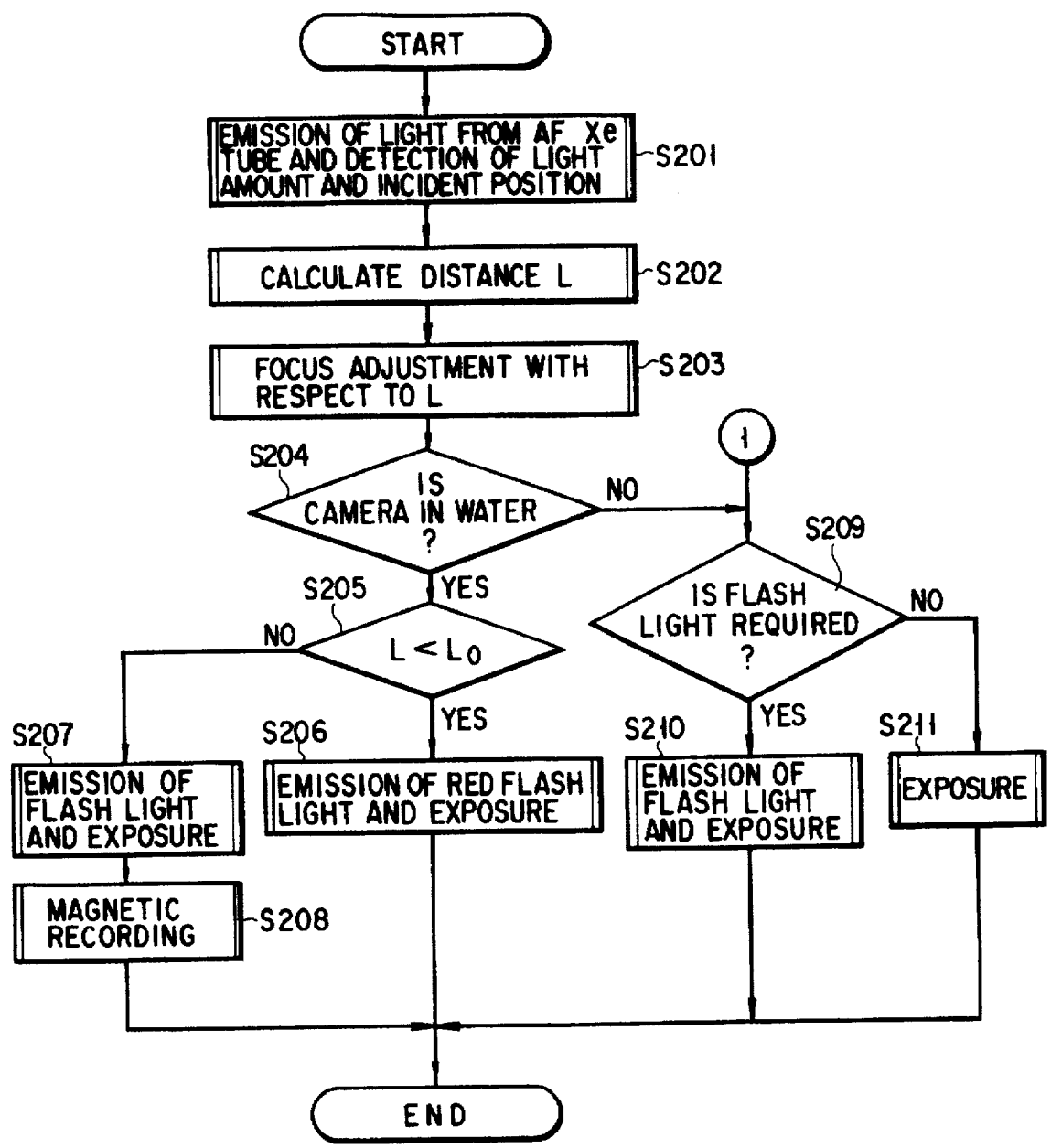
FIG. 24 is a flow chart showing processing to be performed by a CPU 201 as the operation of the camera of the eighth embodiment.

FIG. 24 is a flow chart showing the processing performed by the CPU 201 as the operation of the camera of the eighth embodiment.

When a photographing operation is started, the CPU 201 causes the emission circuit 224 to output a high-voltage trigger signal to the AF Xe tube 220 in step S201 to cause the Xe tube 220 to start emitting light. As a result, the reflected signal light from the object 223 is incident on the two sensors 227 and 228. With this operation, the AFIC 229 outputs, to the CPU 201, a signal dependent on the incident position of the reflected signal light on the sensor 228 and a signal dependent on the amounts of light incident on the sensors 227 and 228.

Subsequently, in step S202, the CPU 201 calculates a distance L to the object 223 in accordance with the signal dependent on the incident position on the sensor 228. In step S203, the CPU 201 performs focus adjustment with respect to the distance L calculated in step S202.

In step S204, the CPU 201 calculates the ratio between signals dependent on the amounts of light incident on the two sensors 227 and 228, i.e., the ratio between the infrared light component and visible light component of the reflected signal light to check whether the camera is used in water or in air.

In step S204, if the infrared light amount is extremely smaller than the visible light amount, the CPU 201 determines that the camera is used in water, and the flow advances to step S205. In step S205, the CPU 201 checks whether the distance L to the object 223, which is obtained in step S202, is smaller than a predetermined distance L0. If YES in step S205, the flow advances to step S206. If NO in step S205, the flow advances to step S207. Assume that the distance L to the object 223 is smaller than 1 m. In this case, in step S206, the CPU 201 causes the Xe tube 231 for an electronic flash operation, which has the red filter 232 in front thereof, to emit light to assist the red light which tends to be absorbed in water, thereby performing exposure.

If it is determined in step S205 that the distance L is not smaller than the predetermined distance $L_0$, i.e., the distance L is a long distance, the flow advances to step S207, in which the CPU 201 causes the Xe tube 230 for an electronic flash operation, which does not have the red filter 232, to emit light to perform exposure, because only the red flash light has an insufficient light amount.

In step S208, the CPU 201 causes the magnetic recording section 205 and the magnetic head 205a to magnetically write information indicating that the corresponding frame of the film 204 is obtained by an underwater photographing operation and the information of the distance L on the information recording portion of the film 204.

If it is determined in step S204 that the camera is not used in water, i.e., the camera is used in air (on land), the flow branches to step S209. In step S209, the CPU 201 checks the necessity of emission of flash light in accordance with the object brightness and the film speed. If the emission of flash light is required, the flow advances to step S210 to emit flash light and perform exposure. If the emission of flash light is not required, the flow advances to step S211 to perform exposure.

The necessity to record the distance L in step S208 will be described with reference to FIGS. 14 and 25.

The light absorption coefficient α in FIG. 14 indicates that light of a light amount $P_0$ is absorbed in water until it reaches the position at the distance L to become light of a light amount $P_W$ according to the following equation:

$$P_W = P_0 \cdot e^{-\alpha L} \quad (16)$$

As is apparent, when flash light or distance measurement light is reflected by the object at the distance L, the distance is twice the distance L in equation (16) to become 2L. As a result, the following relationship is established:

$$P_W = P_0 \cdot e^{-2\alpha L} \quad (17)$$

This light absorption coefficient α has wavelength dependence, as described above. Blue light exhibits an absorption coefficient of about 0.01; and red light, an absorption coefficient of about 1. FIG. 25 shows the ratio between the amounts of red light and blue light, which are obtained with substitutions of these values into equation (17). For example, at an object distance of 4 m, the amount of blue light is about 3,000 times that of red light.

This means that even if an object is illuminated with flash light, only blue light returns, and only a bluish photograph can be taken.

That is, the ratio between the amounts of blue light and red light changes with a change in object distance, as shown in FIG. 25. For this reason, in step S208 in the flow chart shown in FIG. 24, distance information is also recorded.

In a printing operation, printing correction is performed to suppress development of blue for long-distance photography. In contrast to this, for near-distance photography, since the ratio of the amounts of blue light and red light does not greatly change, the degree of printing correction is decreased.

In addition, the CPU 201 may calculate a printing correction amount from the object distance, and the calculated amount may be recorded on the film 204.

As described above, according to the eighth embodiment, since the underwater detection section and the distance measurement section are constituted by common parts, a simple, compact camera can be realized.

A camera according to the ninth embodiment of the present invention will be described next.

FIG. 26 shows the arrangement of the characteristic portion of the camera according to the ninth embodiment of the present invention.

In the ninth embodiment, a red filter is arranged behind the photographing lens to be located on its optical axis according to the same concept as that of the electronic flash device with the red filter in the eighth embodiment, and a different means is used as an underwater detection section 202.

In the underwater detection section 202, a CPU 201 causes a light-emitting element 261 to emit light through an emission circuit 260, and causes the light from the light-emitting element 261 to be incident on a prism 262. The light incident on the prism 262 reflected according to the condition of the total reflection surface of the prism 262 and is incident on a light-receiving element 263. The CPU 201 monitors an output from the light-receiving element 263 through a light-receiving circuit 264.

When the camera having the underwater detection section 202 enters the water, the condition of the total reflection surface of the prism 262 is no longer satisfied because of a difference in refractive index, and the amount of received light decreases. As a result, underwater detection can be performed.

A shutter 266 is arranged in the optical path of a photographing lens 265, together with a red filter 267 which can be inserted/withdrawn in/from the optical path. The red filter 267 can be slid by a motor 269 driven through a motor driver (MD) 268. With this operation, the filter 267 can be inserted/withdrawn in/from the optical path.

In the ninth embodiment, therefore, when the output from the light-receiving circuit 264 decreases during the operation of the emission circuit 260, the CPU 201 detects that the camera is in water. The CPU 201 then causes the motor driver 268 to rotate the motor 269 so as to insert the red filter 267 in the optical path of the photographing optical system. The above operation suppresses the phenomenon that an underwater photograph becomes more bluish than the actual colors.

As described above, according to the ninth embodiment, an underwater photograph with natural colors can be taken even with a film having no magnetic recording area.

In addition, the ninth embodiment can be applied to not only a film having no magnetic recording area but also a reversal film an the like.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera comprising:

underwater discrimination means for discriminating whether said camera is used in water;

an electronic flash device for projecting auxiliary illumination light toward an object to be photographed in a photographing operation; and exposure control means for changing control of an exposure amount of flash light from said electronic flash device with respect to a film surface in accordance with a discrimination result obtained by said underwater discrimination means; and wherein said exposure control means controls an amount of light to be emitted from said electronic flash device in consideration of a light absorption coefficient α in water when said underwater discrimination means discriminates that said camera is in water, and wherein the light absorption coefficient α is predetermined in accordance with the light absorption characteristics of the water and is preset in the camera.

2. A camera comprising:

underwater discrimination means for discriminating whether said camera is used in water;

an electronic flash device for projecting auxiliary illumination light toward an object to be photographed in a photographing operation; and exposure control means for changing control of an exposure amount of flash light from said electronic flash device with respect to a film surface in accordance with a discrimination result obtained by said underwater discrimination means; and wherein said exposure control means decides an f-number of a photographing lens in a light-emitting operation in consideration of a light absorption coefficient e in water when said underwater discrimination means discriminates that said camera is in water, and wherein the light absorption coefficient α is predetermined in accordance with the light absorption characteristics of the water and is preset in the camera.

3. A camera according to claim 1, further comprising photometric means for measuring a luminance of ambient light; and wherein said exposure control means compares a photometric value obtained by said photometric means with a determination level, and inhibits emission of light from said electronic flash device when the photometric value is higher than the determination level, and changes the determination level in accordance with a discrimination result obtained by said underwater discrimination means.

4. A camera according to claim 1, further comprising a magnetic recording apparatus which, and magnetically records a discrimination result obtained by said underwater discrimination means.

5. A camera according to claim 1, wherein said electronic flash device emits light containing a large amount of red-light components.

6. A camera according to claim 2, further comprising photometric means for measuring a luminance of ambient light; and wherein said exposure control means compares a photometric value obtained by said photometric means with a determination level, and inhibits emission of light from said electronic flash device when the photometric value is higher than the determination level, and changes the determination level in accordance with a discrimination result obtained by said underwater discrimination means.

7. A camera according to claim 2, further comprising a magnetic recording apparatus which magnetically records a discrimination result obtained by said underwater discrimination means.

8. A camera according to claim 2, wherein said electronic flash device emits light containing a large amount of red-light components.

* * * * *